US008531515B2

(12) United States Patent
Watanabe et al.

(10) Patent No.: US 8,531,515 B2
(45) Date of Patent: Sep. 10, 2013

(54) IMAGING APPARATUS

(75) Inventors: Yuko Watanabe, Hachioji (JP); Yoko Saito, Hachioji (JP); Tomoko Kobayashi, Hachioji (JP); Koichi Shintani, Hachioji (JP)

(73) Assignee: Olympus Imaging Corp., Tokyo (JP)

( * ) Notice: Subject to any disclaimer, the term of this patent is extended or adjusted under 35 U.S.C. 154(b) by 529 days.

(21) Appl. No.: 12/891,483

(22) Filed: Sep. 27, 2010

(65) Prior Publication Data

US 2011/0074945 A1 Mar. 31, 2011

(30) Foreign Application Priority Data

Sep. 29, 2009 (JP) ................................. 2009-225363
Sep. 29, 2009 (JP) ................................. 2009-225364
Sep. 30, 2009 (JP) ................................. 2009-228282

(51) Int. Cl.
*H04N 5/225* (2006.01)

(52) U.S. Cl.
USPC ................................ 348/81; 715/848; 702/15

(58) Field of Classification Search
USPC ........................................................ 348/81
See application file for complete search history.

(56) References Cited

U.S. PATENT DOCUMENTS

| 7,710,465 | B2 * | 5/2010 | Takita ......................... 348/222.1 |
| 2011/0228074 | A1 * | 9/2011 | Parulski et al. ................. 348/81 |
| 2011/0228075 | A1 * | 9/2011 | Madden et al. ................. 348/81 |

FOREIGN PATENT DOCUMENTS

JP 2008-083170 4/2008

* cited by examiner

*Primary Examiner* — Sath V Perungavoor
*Assistant Examiner* — Howard D Brown, Jr.
(74) *Attorney, Agent, or Firm* — John C. Pokotylo; Straub & Pokotylo

(57) ABSTRACT

An imaging apparatus includes an imaging unit for capturing a subject and generating image data of the subject, an operation input unit for receiving inputs of operation signals containing a release signal for instructing the imaging unit to shoot, an acceleration detector for detecting an acceleration of the imaging apparatus, a state detector for separately detecting a case in which the imaging apparatus is overland, a case in which the imaging apparatus is underwater and a photographer shoots while swimming, and a case in which the imaging apparatus is underwater and the photographer shoots while changing a water depth, and a control unit for performing operation control depending on an input into the operation input unit and/or into the acceleration detector according to a state detection result by the state detector.

29 Claims, 28 Drawing Sheets

|  | UNDERWATER ||  OVERLAND |
|---|---|---|---|
|  | DIVING | SWIMMING |  |
| STILL IMAGE SHOOTING | EITHER HAND | BOTH HANDS | BOTH/EITHER |
| MOVING PICTURE SHOOTING | × | EITHER HAND | BOTH/EITHER |
| SWITCH OPERATION | DIFFICULT | EASY | EASY |

FIG.27

|  | UNDERWATER | OVERLAND |
|---|---|---|
| RELEASE | EASY | EASY |
| INDIVIDUAL SWITCH OPERATION | DIFFICULT | EASY |
| PLAY | NOT NECESSARY | NECESSARY |

FIG.28

| NUMBER OF TIMES | OPERATION |
|---|---|
| 1 | POWER-ON (SET IN STILL IMAGE SHOOTING MODE) |
| 2 | SWITCH TO STROBE-ON MODE |
| 3 | SWITCH TO STROBE-OFF MODE |
| 4 | SWITCH TO MOVING PICTURE SHOOTING MODE |
| 5 | POWER OFF |

| NUMBER OF TIMES | OPERATION |
|---|---|
| 1 | POWER-ON (SET IN STILL IMAGE SHOOTING MODE) |
| 2 | SWITCH TO MACRO MODE |
| 3 | SWITCH TO CLOSEUP MODE |
| 4 | SWITCH TO STROBE-OFF MODE |
| 5 | SWITCH TO MOVING PICTURE SHOOTING MODE |
| 6 | POWER-OFF |

IMAGING APPARATUS

CROSS-REFERENCE TO RELATED APPLICATIONS

This application is based upon and claims the benefit of priority from Japanese Patent Application No. 2009-225363, filed on Sep. 29, 2009, Japanese Patent Application No. 2009-225364, filed on Sep. 29, 2009 and Japanese Patent Application No. 2009-228282, filed on Sep. 30, 2009, the entire contents of which are incorporated herein by reference.

BACKGROUND OF THE INVENTION

1. Field of the Invention

The present invention relates to an imaging apparatus for capturing a subject and generating image data of the subject.

2. Description of the Related Art

In recent years, there has been developed in an imaging apparatus such as digital camera or digital video camera, a technique having functions suitable for underwater shooting mounted thereon. For example, there is known a technique in which a zoom operation and a shooting operation are performed through a single operation during underwater shooting so as not to miss a photo opportunity (see Japanese Laid-open Patent Publication No. 2008-83170 Publication, for example). With this technique, releasing and zooming can be discriminated depending on the length of time for which a photo trigger is being pressed and the zoom operation and the shooting operation can be performed only by the photo trigger.

SUMMARY

An imaging apparatus according to the present invention includes: an imaging unit for capturing a subject and generating image data of the subject; an operation input unit for receiving inputs of operation signals containing a release signal for instructing the imaging unit to shoot; an acceleration detector for detecting an acceleration of the imaging apparatus; a state detector for separately detecting a case in which the imaging apparatus is overland, a case in which the imaging apparatus is underwater and a photographer shoots while swimming, and a case in which the imaging apparatus is underwater and the photographer shoots while changing a water depth; and a control unit for performing operation control depending on an input into the operation input unit and/or into the acceleration detector according to a state detection result by the state detector.

The above and other features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 27 is a diagram showing an operation's difficulty level and a necessity for play mode in underwater shooting and overland shooting;

FIG. 28 is a diagram showing setting contents depending on the number of times of tapping when the imaging apparatus according to the fifth embodiment of the present invention is set in the underwater shooting mode;

DETAILED DESCRIPTION OF THE PREFERRED EMBODIMENTS

Embodiments for implementing the present invention (which will be referred to as "embodiments" below) will be described below with reference to the accompanying drawings.

First Embodiment

Figure 1:
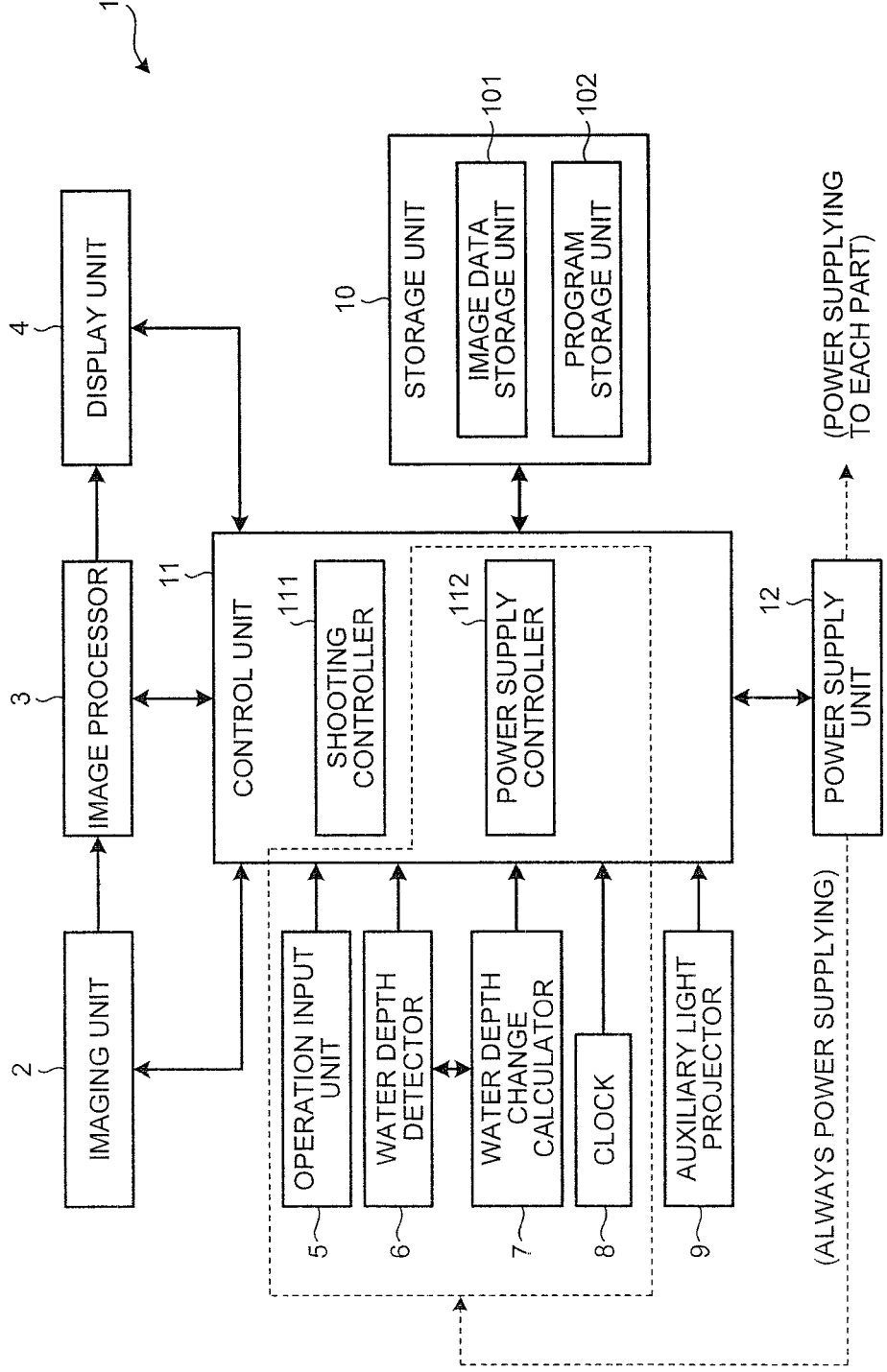
FIG. 1 is a block diagram showing a configuration of an imaging apparatus according to a first embodiment of the present invention.

FIG. 1 is a block diagram showing a configuration of an imaging apparatus according to a first embodiment of the present invention. An imaging apparatus 1 shown in FIG. 1 includes an imaging unit 2 for capturing a subject and generating electronic image data of the captured image, an image processor 3 for performing image processes such as edge enhancement, color correction and image compression on the image data generated by the imaging unit 2, a display unit 4 for displaying information containing an image corresponding to the image data processed by the image processor 3, an operation input unit 5 for receiving inputs of various operation signals of the imaging apparatus 1, a water depth detector 6 for detecting a water depth of the imaging apparatus 1 at a predetermined period, a water depth change calculator 7 for calculating the amount of change in water depth detected by the water depth detector 6, a clock 8 having a shooting time/date decision function and a timer function, an auxiliary light projector 9 for projecting an auxiliary light onto a viewing area of the imaging unit 2, a storage unit 10 for storing therein various items of information containing the image data processed by the image processor 3, a control unit 11 for controlling operations of the imaging apparatus 1 according to the operation signals input by the operation input unit 5, and a power supply unit 12 for supplying power to the respective parts in the imaging apparatus 1 under control of the control unit 11.

The imaging unit 2 includes an optical system which is configured with one or multiple lenses and is for condensing lights from a subject present in a predetermined viewing area, a diaphragm which adjusts the amount of incident lights condensed by the optical system, a shutter which operates in response to a release input, an imaging device such as Charge Coupled Device (CCD) which receives a light passing through the diaphragm and the shutter and converts it into an electric signal, and a signal process circuit which performs signal processes such as amplification and white balancing on an analog signal output from the imaging device and then generates digital image data by A/D conversion.

The display unit 4 is provided on a surface (rear surface) opposite to a surface (front surface) on which the optical system of the imaging unit 2 is present, and displays operation information or shooting information of the imaging apparatus 1 as well as the image data as needed. The display unit 4 is realized with a display panel made of liquid crystal, plasma or organic Electro Luminescence (EL).

The operation input unit 5 includes a release switch for inputting a release signal and a power supply switch for inputting power-on and power-off instruction signals. In the first embodiment, "power-on" means a transition to a state where the power supply unit 12 can supply power to the entire imaging apparatus 1, and "power-off" means that the power supply unit 12 stops supplying power to the entire imaging apparatus 1.

The water depth detector 6 is realized with a water pressure sensor. A water pressure detected by the water pressure sensor is on the order of 1060 hPa at a water depth of 50 cm, and becomes higher as the water depth is more. The water depth detector 6 has a function of temporarily storing at least two latest water depth detection results.

When the release switch of the operation input unit 5 is pressed, the water depth change calculator 7 calculates changes between the two latest water depths detected and stored by the water depth detector 6. The water depth change calculator 7 has a function of deciding whether the detection result by the water depth detector 6 indicates a value which can be regarded as underwater. The water depth change calculator 7 calculates a change in water depth when the release button is pressed while power is not being supplied to parts containing the imaging unit 2. The water depth change calculator 7 calculates a change in water depth also when power is being supplied to the entire imaging apparatus 1 containing the imaging unit 2 and operation inputting is performed through the operation input unit 5 other than the release switch.

The water depth detector 6 and the water depth change calculator 7 function as a state detector for discriminating a case where the imaging unit 2 is underwater and shooting is done in a floating state with less water depth change from a case where the imaging unit 2 shoots underwater with large water depth change.

The storage unit 10 includes an image data storage unit 101 for storing therein the image data shot by the imaging unit 2 and processed by the image processor 3, and a program storage unit 102 for storing therein various programs to be executed by the imaging apparatus 1. The storage unit 10 is realized with a semiconductor memory such as flash memory or Random Access Memory (RAM) fixedly provided inside the imaging apparatus 1. The storage unit 10 may function as a recording medium interface for recording information in an externally-mounted recording medium such as memory card and reading out information recorded in the recording medium.

The control unit 11 includes a shooting controller 111 for controlling the shooting by the imaging unit 2 and a power supply controller 112 for controlling the power supplying by the power supply unit 12. The control unit 11 is realized with a Central Processing Unit (CPU) and is connected to the respective parts in the imaging apparatus 1 via a bus line.

The power supply unit 12 always supplies power to the operation input unit 5, the water depth detector 6, the water depth change calculator 7, the clock 8 and the power supply controller 112 irrespective of whether the imaging apparatus 1 has been activated by the power supply switch. Thus, the operation input unit 5, the water depth detector 6, the water depth change calculator 7, the clock 8 and the power supply controller 112 are being always activated. The operation input unit 5, the water depth detector 6, the water depth change calculator 7, the clock 8 and the power supply controller 112 are referred to as always-on parts.

If power supplying is desired to be significantly reduced, the always-on parts may be changed depending on mode setting. For example, if the underwater shooting mode can be manually set, power may be supplied to the water depth detector 6 and the water depth change calculator 7 only when the underwater shooting mode is set.

The above-configured imaging apparatus 1 has on its exterior a waterproof casing whose surfaces are tightly sealed. The waterproof casing is disclosed in Japanese Laid-open Patent Publication No. 2008-180898, for example.

Figure 2:
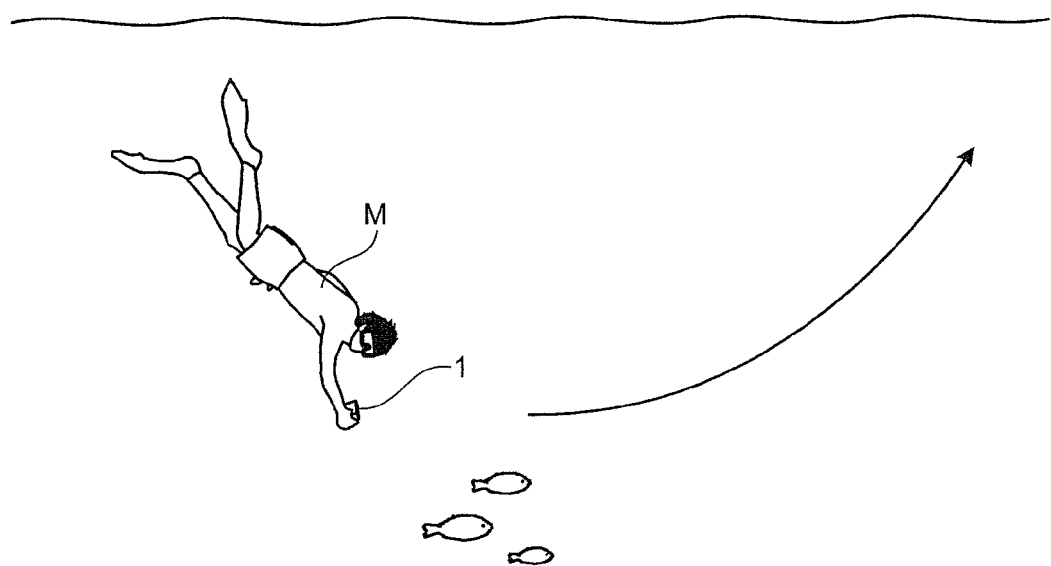
FIG. 2 is a diagram showing a situation in which the imaging apparatus according to the first embodiment of the present invention performs characteristic processes.
Figure 3:
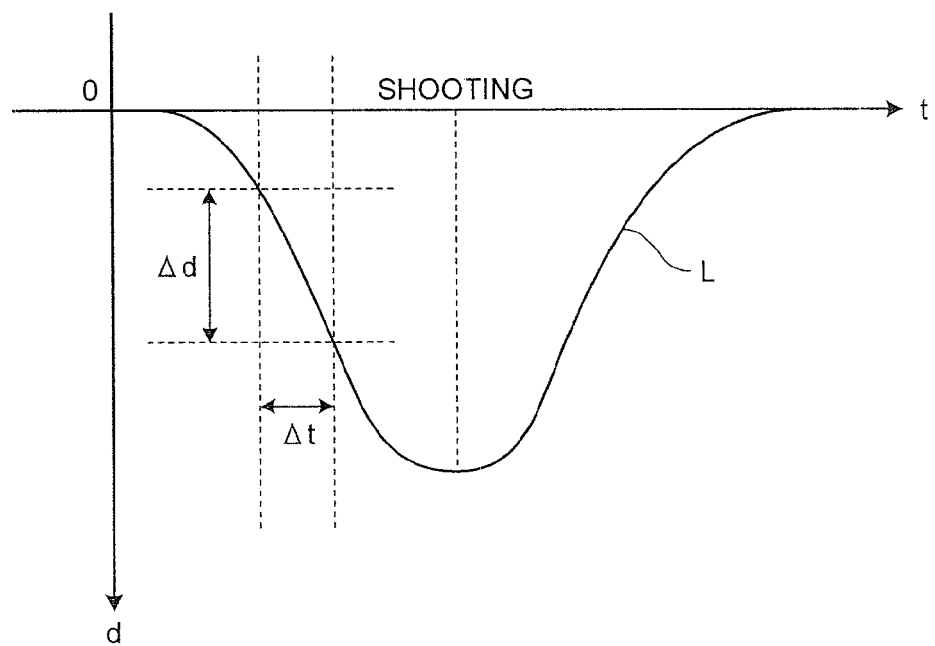
FIG. 3 is a diagram showing a temporal water depth change when a photographer shoots while skin diving.

FIG. 2 is a diagram showing a situation in which the features of the imaging apparatus 1 are expressed. Specifically, FIG. 2 shows a situation in which a photographer M is underwater and uses the imaging apparatus 1 for underwater shooting. Under the situation, the photographer M has to hold his/her breath underwater. Thus, the photographer M is likely to rapidly surface immediately after shooting. A water depth d of the imaging apparatus 1 before and after the photographer M shoots underwater changes as a curved line L indicated in FIG. 3. In FIG. 3, the horizontal axis indicates time t and the vertical axis indicates water depth d (positive in the downward direction).

When heavily-equipped diving is performed such as scuba diving, a holding form of the imaging apparatus 1 has a high degree of freedom during still image shooting or moving picture shooting. The first embodiment assumes that the shooting by the imaging apparatus 1 is controlled when the photographer goes under the water to a water depth of about 5 m which is reachable by skin diving. "Skin diving" in the first embodiment includes snorkeling but does not include heavily-equipped diving such as scuba diving. The same is applied to the second to seventh embodiments described later.

While the photographer M is underwater with the imaging apparatus 1, the photographer M can only press the release switch of the operation input unit 5. Thus, in the first embodiment, the power supply controller 112 supplies power to the entire imaging apparatus 1 (turns on the power supply) when the release switch is pressed while the water depth change per predetermined time is larger than a predetermined threshold. Thereafter, the shooting controller 111 changes the shooting conditions such as exposure time and gain in the imaging unit 2 and then continuously takes a predetermined number of photos. More specifically, since the photographer easily reels underwater, the shooting controller 111 reduces the exposure time and enhances the gain, thereby improving sensitivity. With the controlling, the photographer which cannot freely move underwater and is difficult to adjust the shooting timing can accurately shoot a desired subject.

Figure 4:
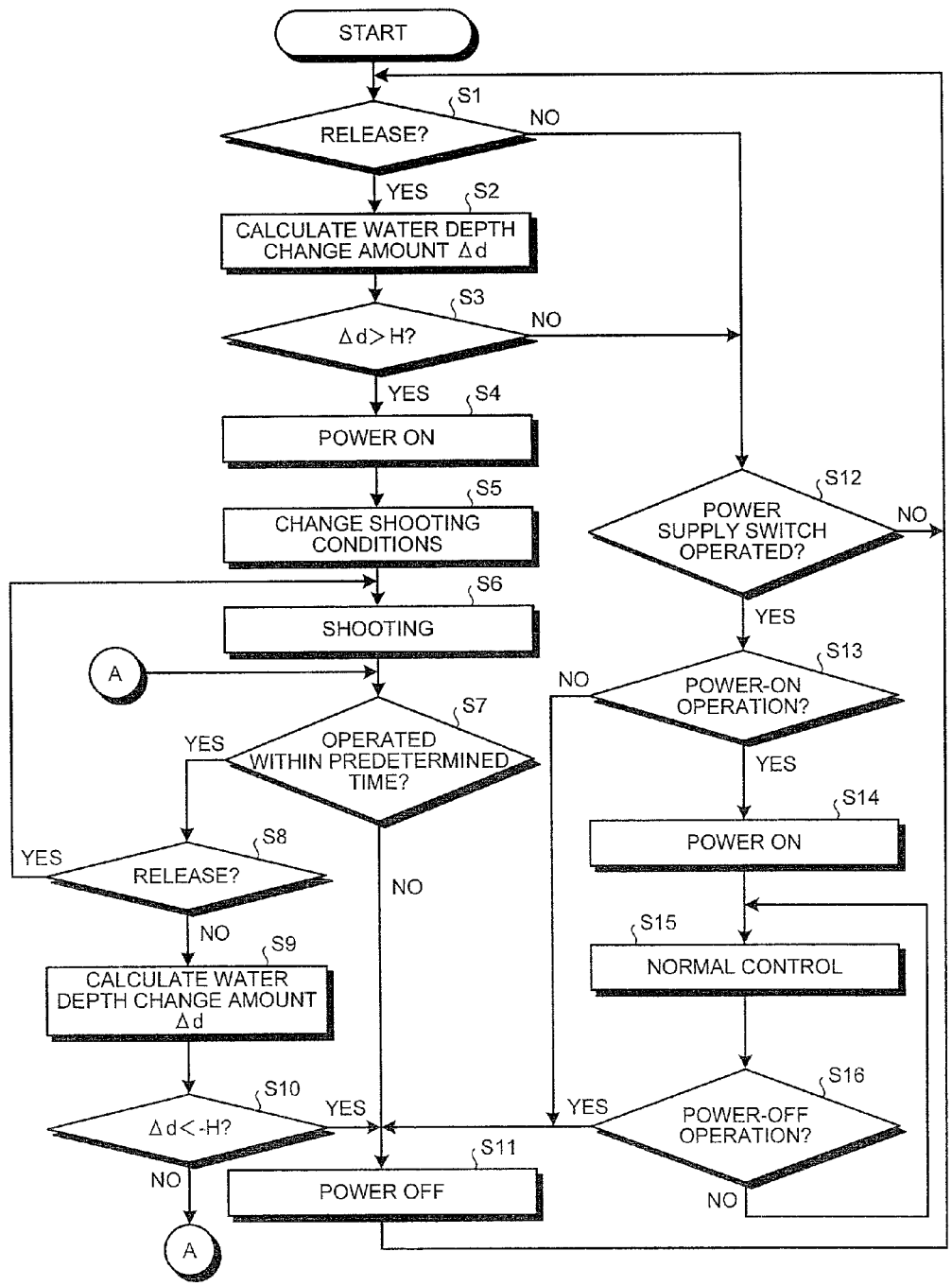
FIG. 4 is a flowchart showing an outline of processes to be performed by the imaging apparatus according to the first embodiment of the present invention.

FIG. 4 is a flowchart showing an outline of processes to be performed by the imaging apparatus 1. In FIG. 4, when the release switch of the operation input unit 5 is operated (step S1: Yes), the water depth change calculator 7 calculates the amount of change $\Delta d$ between two latest water depths detected by the water depth detector 6 (step S2). As a result of the calculation by the water depth change calculator 7, when the amount of change $\Delta d$ in water depth is larger than a first threshold H ($>0$) (step S3: Yes), the power supply controller 112 controls the power supply unit 12 to supply power to each unit in the imaging apparatus 1 (step S4). The transition to a state where the power supply unit 12 can supply power to the entire imaging apparatus 1 will be referred to as "power-on" below. The first threshold H may employ a value of about 1 m. A detection period $\Delta t$ of the water depth detector 6 may be on the order of 2 seconds.

After the shooting controller 111 has changed the shooting conditions (step S5), the powered-on imaging apparatus 1 causes the imaging unit to shoot (step S6). Specifically, the shooting controller 111 sets the exposure time of the imaging unit 2 to be shorter than the initial setting and enhances the gain of the imaging unit 2 to be higher than the initial setting, and then causes the imaging unit 2 to take a predetermined number (such as five) of photos serially. If the shooting controller 111 causes the auxiliary light projector 9 to project an auxiliary light, a red-color component, which is easily lost underwater, can be compensated and a vivid image can be shot, which is preferable.

Thereafter, when the operation input unit 5 is operated within a predetermined time (such as 1 minute) (step S7: Yes) and when the operation is by the release switch (step S8: Yes), the imaging apparatus 1 returns to step S6. On the other hand, when the operation by the operation input unit 5 is not the release switch operation (step S8: No), the water depth change calculator 7 uses the two latest detection results by the water depth detector 6 to calculate the amount of change Δd in water depth (step S9).

When the calculation result in step S9 is smaller than a second threshold −H (step S10: Yes), the power supply controller 112 controls the power supply unit 12 to stop supplying power to the entire imaging apparatus 1 other than the always-on parts (step S11). The process in step S11 will be referred to as "power-off" below. As far as the second threshold has a different sign from the first threshold H, they do not have to have the same absolute value. The imaging apparatus 1 performs step S11 and then returns to step S1.

When the operation input unit 5 is not operated within the predetermined time in step S7 (step S7: No), the imaging apparatus 1 proceeds to step S11.

When the amount of change Δd in water depth is equal to or more than the second threshold −H in step S10 (step S10: No), the imaging apparatus 1 returns to step S7. When the imaging apparatus returns from step S10 to step S7, the clock 8 performs measurements while setting the time point of the latest operation (other than the release operation) to zero.

There will be described a case in which the release signal is not input in step S1 (step S1: No) and the amount of change Δd is equal to or less than H in step S3 (step S3: No). In the case, when the power supply switch is operated (step S12: Yes), and the power supply switch operation is the power-on operation (step S13: Yes), the power supply controller 112 controls the power supply unit 12 to turn on (step S14). Thereafter, the control unit 11 performs normal control (step S15). "Normal control" means that the controlling is first started in the shooting mode and shooting or mode switching is performed depending on the inputs of various operation signals from the operation input unit 5.

When the control unit 11 performs normal control and then the power-off operation is performed (step S16: Yes), the imaging apparatus 1 proceeds to step S11. On the other hand, when the control unit 11 performs normal control and then the power-off operation is not performed (step S16: No), the imaging apparatus 1 continues the normal control (step S15).

When the power supply switch is not operated in step S12 (step S12: No), the imaging apparatus 1 returns to step S1.

When the power supply switch operation is not the power-on operation in step S13 (step S13: No), that is, the power supply switch operation is the power-off operation, the imaging apparatus 1 proceeds to step S11.

As described above, in the first embodiment, when the amount of change Δd in water depth exceeds the first threshold H while the power supply is not being turned on underwater, the power supply is automatically turned on, the shooting conditions are changed and then the continuous shooting is started. Thus, if the photographer wants to shoot fishes while skin diving, a time from diving to shooting can be reduced and the images containing fishes are likely to be shot.

According to the first embodiment of the present invention described above, since the imaging apparatus is configured to continuously shoot predetermined number of times when the release switch is pressed while the water depth becomes rapidly larger due to diving, a desired image is likely to be contained in the continuously-shot images even when the photographer is concentrating hard on swimming. Thus, the photographer can easily shoot while diving, and is likely to obtain a desired image.

Further, according to the first embodiment, since the power supply is turned off whenever the photographer emerges underwater or the release signal is not input, the battery can last long.

Second Embodiment

Figure 5:
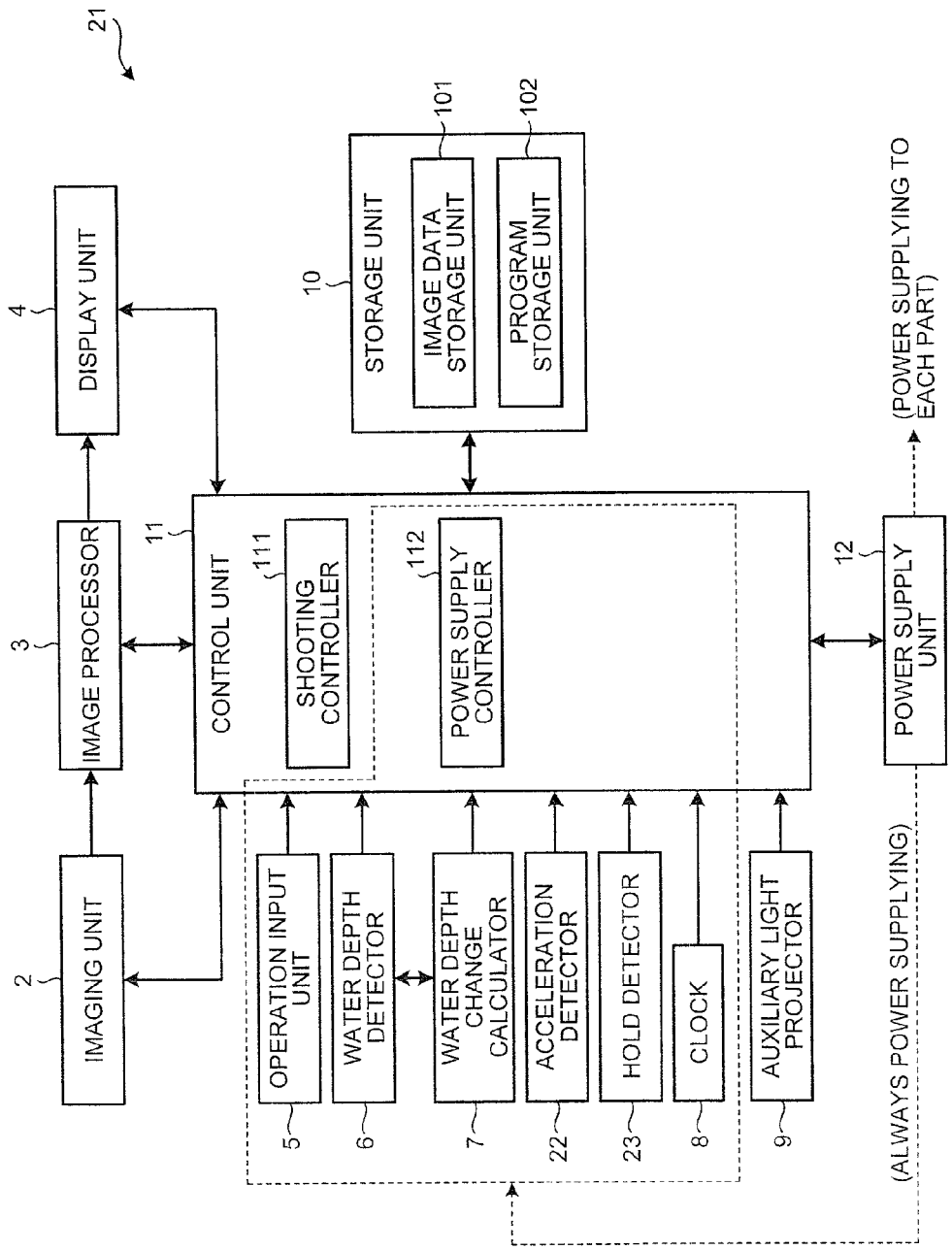
FIG. 5 is a block diagram showing a configuration of an imaging apparatus according to a second embodiment of the present invention.

FIG. 5 is a block diagram showing a configuration of an imaging apparatus according to a second embodiment of the present invention. An imaging apparatus 21 shown in FIG. 5 further includes an acceleration detector 22 for detecting an acceleration of the imaging apparatus 1 and a hold detector 23 for detecting an external hold at a predetermined position of the imaging apparatus 1 in addition to the configuration of the imaging apparatus 1.

Figure 6:
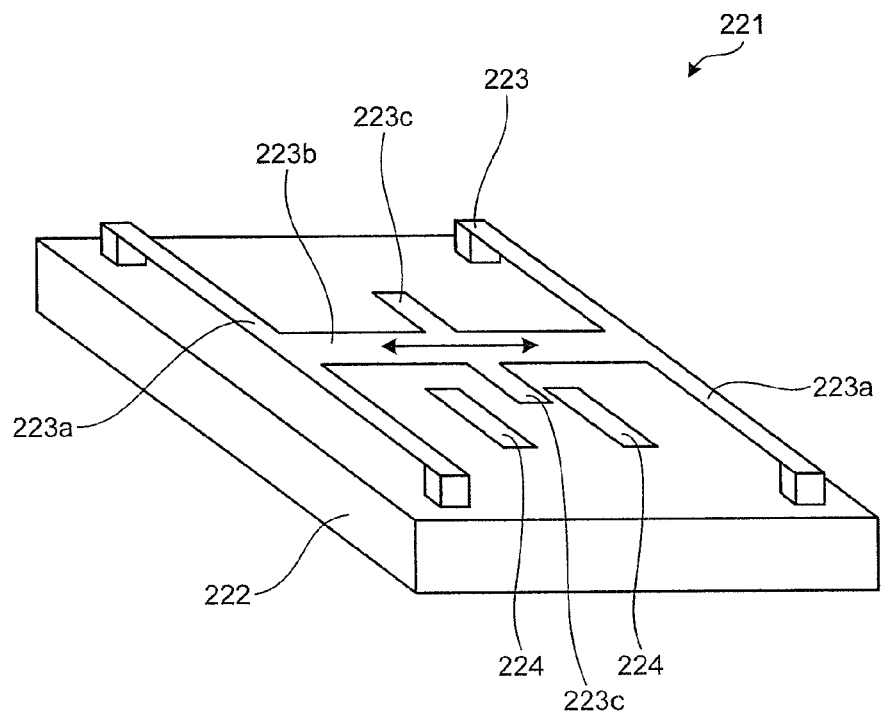
FIG. 6 is a diagram showing a configuration of an acceleration sensor which is part of an acceleration detector provided in the imaging apparatus according to the second embodiment of the present invention.

FIG. 6 is a diagram showing a configuration of an acceleration sensor which is part of the acceleration detector 22. An acceleration sensor 221 shown in FIG. 6 is a capacitance-type acceleration sensor formed by Micro Electro Mechanical Systems (MEMS) process. The acceleration sensor 221 includes a metallic movable part 223 having a beam structure in which the ends of the beam are fixedly bridged near the four corners of the main surface of a parallelepiped chip 222, and two metallic plate parts 224 provided on the main surface, on which the ends of the movable part 223 are fixed, of the chip 222. The movable part 223 includes two extension parts 223a which extend in a belt shape in the same direction along the main surface of the chip 222 and both ends of which are fixed, a belt-shaped connection part 223b which connects the center portions of the two extension parts 223a in the orthogonal direction to the direction in which the extension parts 223a extend, and a projection part 223c which projects in a belt shape from the center portion of the connection part 223b in parallel to the direction in which the extension parts 223a extend.

When an acceleration in the horizontal direction (in the direction of arrow) in FIG. 6 is applied to the acceleration sensor 221 having the above structure, the movable part 223 is flexibly deformed in the horizontal direction so that the positional relationship between the projection part 223c and the plate parts 224 changes and thus the capacitance changes. The acceleration sensor 221 outputs a signal change based on the change in capacitance. The acceleration detector 22 can be used for decision on hand's giggling or correction based on the decision.

Figure 7:
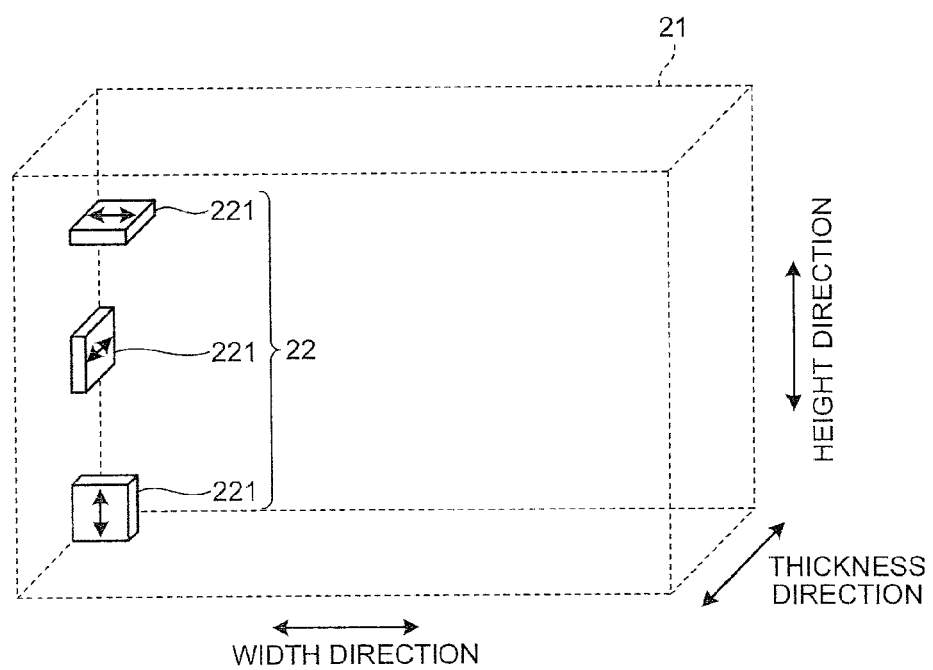
FIG. 7 is a diagram schematically showing a configuration of the acceleration detector provided in the imaging apparatus according to the second embodiment of the present invention.

FIG. 7 is a diagram schematically showing a configuration of the acceleration detector 22 in the imaging apparatus 21. As shown in FIG. 7, the acceleration detector 22 includes three acceleration sensors 221 the acceleration detecting directions of which are orthogonal to each other. With the acceleration detector 22 having the above configuration, when the photographer instantaneously taps a surface of the imaging apparatus 21, the acceleration generated by the tap operation can be accurately detected.

Figure 8:
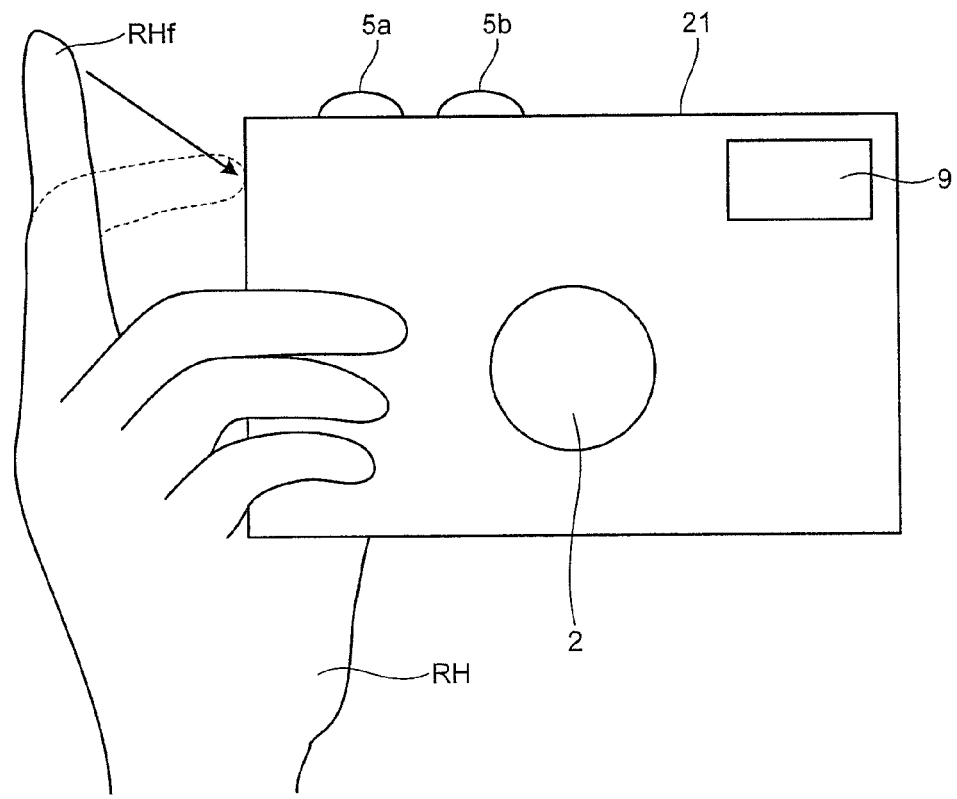
FIG. 8 is a diagram showing a situation in which the photographer taps a surface of the imaging apparatus according to the second embodiment of the present invention.

FIG. 8 is a diagram showing a situation in which the photographer taps a surface of the imaging apparatus 21. When the photographer taps the left side surface of the surfaces of the imaging apparatus 21 viewed from the front surface with the forefinger RHf of the right hand RH, the acceleration detector 22 detects an acceleration which has main components in the horizontal direction of FIG. 8 (corresponding to the width direction of FIG. 7) and a magnitude larger than a predetermined value which can be regarded as tap, and which indicates a pulse-shaped temporal change. Thus, it is possible to decide that the imaging apparatus 21 has been tapped. The predetermined value is set such that a tap signal is not generated unless the photographer consciously taps the imaging apparatus 21. Specifically, the predetermined value may be set as large as the gravity acceleration ($9.8 \text{ m/s}^2$), for example. The pulse width of vibration applied by tapping is on the order of 5 msec while the pulse width of vibration applied by user's walking is on the order of 30 msec. When the acceleration magnitude and the pulse width are used together, it is possible to decide whether a signal applied to the imaging apparatus is the tap signal. When the imaging apparatus 21 is underwater, the predetermined value may be set to be smaller in consideration of water resistance.

The imaging apparatus 21 has a function of preventing unintentional power-on by tapping overland. This is because a tapping-like vibration is likely to occur when the photographer walks with the imaging apparatus 21 overland.

In FIG. 8, two buttons 5a and 5b provided on the top surface of the imaging apparatus 21 are the release switch and the power supply switch, respectively. In the following, the button 5a is referred to as release switch 5a and the button 5b is referred to as power supply switch 5b.

Figure 9:
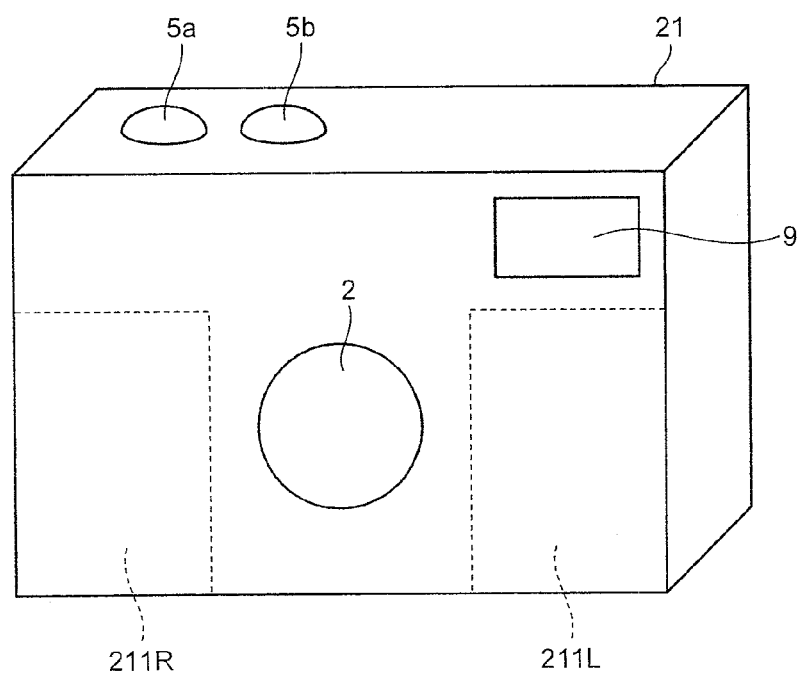
FIG. 9 is a diagram schematically showing detectable areas of a hold detector in the imaging apparatus according to the second embodiment of the present invention.

FIG. 9 is a diagram schematically showing detectable areas of the hold detector 23. The hold detector 23 has a function of detecting the presence of external contact on rectangular areas 211L and 211R provided at the right and left ends on the front surface of the imaging apparatus 21. The hold detector 23 having the function is realized by arranging one or multiple pressure sensors inside each rectangular area, for example. When the photographer holds the imaging apparatus 21 with both hands, the hold detector 23 detects external contact on the rectangular areas 211L and 211R. On the other hand, when the photographer holds the imaging apparatus 21 with either hand, the hold detector 23 detects external contact on either one of the rectangular areas 211L and 211R.

Figures 10, 11:
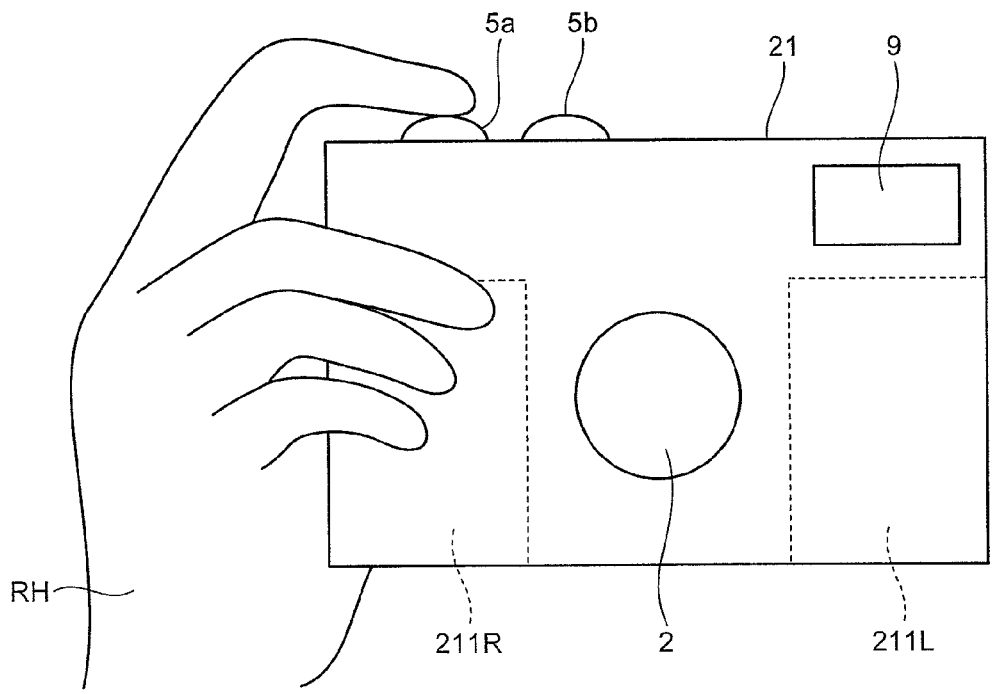
FIG. 10 is a diagram showing a situation in which the photographer holds the imaging apparatus according to the second embodiment of the present invention with the hand.
FIG. 11 is a diagram showing a holding form and a switch operation's difficulty level depending on a usage situation of the imaging apparatus according to the second embodiment of the present invention.

For the imaging apparatus 21 shown in FIG. 9, since the release switch 5a and the power supply switch 5b are provided on the top surface to the right viewed from the photographer, the photographer is likely to hold the imaging apparatus 21 with the right hand RH as shown in FIG. 10. Thus, when the photographer holds the imaging apparatus 21 with either hand, the hold detector 23 is likely to detect external contact on the rectangular area 211R.

The acceleration detector 22 and the hold detector 23 are always being supplied with power from the power supply unit 12 and are being activated similarly to the operation input unit 5, the water depth detector 6, the water depth change calculator 7 and the clock 8.

FIG. 11 is a diagram showing a holding form and a switch operation's difficulty level for still image shooting and moving picture shooting depending on a usage situation of the imaging apparatus 21. When the photographer shoots while skin diving (see FIG. 2), the photographer is likely to use either hand for swimming. Under the situation, when the photographer holds the imaging apparatus 21 with either hand, the imaging apparatus 21 is preferably controlled for still image shooting. In the second embodiment, when the photographer shoots while skin diving, the shooting controller 111 changes the shooting conditions such as exposure and gain for serially taking photos like in the first embodiment. The imaging apparatus 21 is set such that moving picture shooting cannot be done when the photographer holds the imaging apparatus 21 with either hand.

To the contrary, since the photographer is in a relatively stable posture while he/she is swimming immediately below the water surface, the photographer can easily perform the switch operation and hold the imaging apparatus 21 with both hands. For moving picture shooting, the photographer can shoot while moving the imaging apparatus 21 with either hand. Under the situation, the imaging apparatus 21 is set such that still image shooting is performed when the photographer holds the imaging apparatus 21 with both hands while moving picture shooting is performed when the photographer holds the imaging apparatus 21 with either hand.

When the photographer uses the imaging apparatus 21 overland, the control unit 11 performs normal control. In other words, when the imaging apparatus 21 is overland, the control unit 11 switches still image shooting and moving picture shooting through the switch operation.

As described above, in the second embodiment, it is possible to perform optimal control depending on a usage situation of the imaging apparatus 21.

Figure 12:
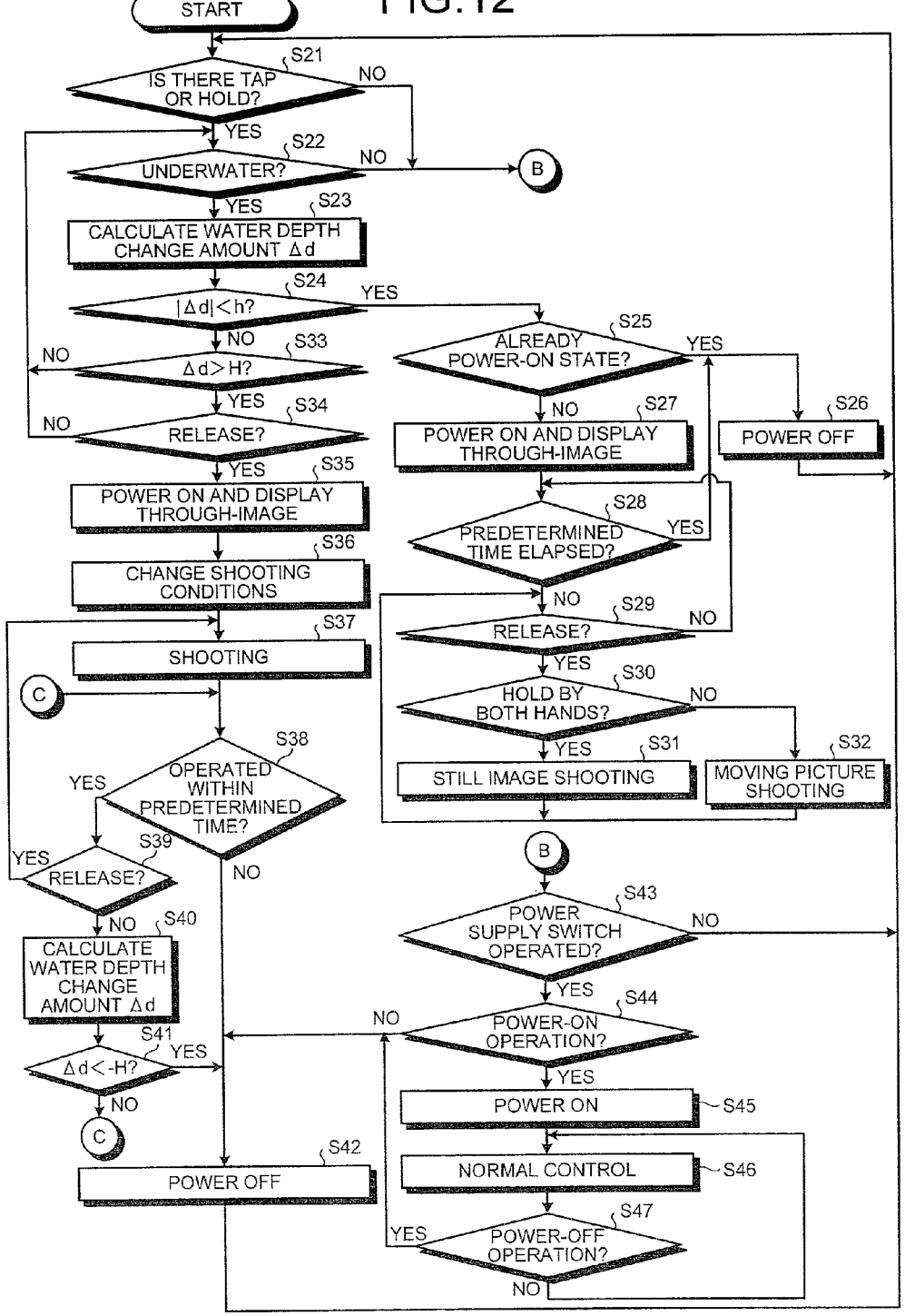
FIG. 12 is a flowchart showing an outline of processes to be performed by the imaging apparatus according to the second embodiment of the present invention.

FIG. 12 is a flowchart showing an outline of processes to be performed by the imaging apparatus 21. There will be first described a case in which the acceleration detector 22 detects a tap or the hold detector 23 detects a hold (step S21: Yes). In this case, the water depth change calculator 7 refers to the result detected by the water depth detector 6, and when the latest detection result indicates a value which can be regarded as underwater (step S22: Yes), calculates the amount of change Δd between the two latest water depths detected by the water depth detector 6 (step S23). In order to detect whether the imaging apparatus 21 is underwater, a water detection switch, which is in a state of conduction by water between two electrodes, may be provided on the surface of the imaging apparatus 21.

As a result of the calculation of the amount of change Δd in water depth by the water depth change calculator 7, when the absolute value |Δd| is smaller than a third threshold h (0<h<H) and the water depth can be regarded as constant (step S24: Yes), that is, when the photographer is swimming immediately below the water surface, and the imaging apparatus 21 is in the power-on state (step S25: Yes), the power supply controller 112 turns off the power supply (step S26) and returns to step S21. The third threshold h is about 30 to 35 cm, for example.

When the imaging apparatus 21 is not in the power-on state in step S25 (step S25: No), the power supply controller 112 turns on the power supply and then the display unit 4 displays the image captured by the imaging unit 2 as through-image (step S27).

When a predetermined time (such as three minutes) has elapsed after the start of the through-image display by the display unit 4 (step S28: Yes), the imaging apparatus 21 proceeds to step S26.

When a predetermined time has not elapsed after the start of the through-image display by the display unit 4 (step S28: No) and when the release switch 5a is operated (step S29: Yes), the subsequent processes are differently performed depending on the detection result by the hold detector 23. First, as a result of the detection by the hold detector 23, when the imaging apparatus 21 is held by both hands (step S30: Yes), the imaging apparatus 21 performs still image shooting (step S31) and returns to step S29. To the contrary, as a result of the detection by the hold detector 23, when the imaging apparatus 21 is held by either hand (step S30: No), the imaging apparatus 21 performs moving picture shooting (step S32) and returns to step S29.

When the release switch 5a is not operated in step S29 (step S29: No), the imaging apparatus 21 returns to step S28.

Next, there will be described a case in which the water depth is not constant in step S24, that is, a case of |Δd|≧h (step S24: No). In this case, when the amount of change Δd in water depth is larger than the first threshold H (step S33: Yes), that is, when the photographer is underwater, and the release switch 5a of the operation input unit 5 is operated (step S34: Yes), the power supply controller 112 turns on the power supply and then the display unit 4 displays a through-image (step S35). The processes in step S36 to S42 subsequent to step S35 sequentially correspond to the processes in step S5 to S11 in FIG. 4. The power supply controller 112 turns off the power supply in step S42 and then the imaging apparatus 21 returns to step S21.

When the amount of change Δd in water depth is equal to or less than the first threshold H in step S33 (step S33: No) and the release switch 5a is not operated in step S34 (step S34: No), the imaging apparatus 21 returns to step S22.

There will be described the processes to be continuously performed when the acceleration detector 22 detects no tap and the hold detector 23 detects no hold in step S21 (step S21: No) and when the value of the latest detection result by the water depth detector 6 cannot be regarded as underwater in step S22 (step S22: No). The processes in step S43 to S47 to be subsequently performed correspond to the processes in step S12 to S16 in FIG. 4 sequentially.

When the power supply switch is not operated in step S43 (step S43: No), the imaging apparatus 21 returns to step S21.

When the power supply switch is not turned on in step S44 (step S44: No) and the power supply is turned off in step S47 (step S47: Yes), the imaging apparatus 21 proceeds to step S42.

When the power supply is not turned off in step S47 (step S47: No), the imaging apparatus 21 continues normal control (step S46).

According to the second embodiment of the present invention described above, since the imaging apparatus is configured such that if the release switch is pressed when the water depth is rapidly changing due to diving, shooting is continuously done predetermined number of times, a desired image is likely to be found in the continuously-shot images even if the photographer is concentrating hard on swimming. Thus, the photographer can easily shoot while diving and is likely to obtain desired images.

According to the second embodiment, since the power supply is turned off whenever the photographer emerges underwater or the release signal is not input, the battery can last long.

According to the second embodiment, still image shooting and moving picture shooting are switched depending on the holding form of the imaging apparatus by the photographer during diving and thus optimal control can be performed depending on the diving situation of the photographer.

In the second embodiment, when the imaging apparatus 21 is overland, various switch operations such as activation of the imaging apparatus 21 may be input by the tap operation. Specific examples thereof will be described below.

Figure 13:
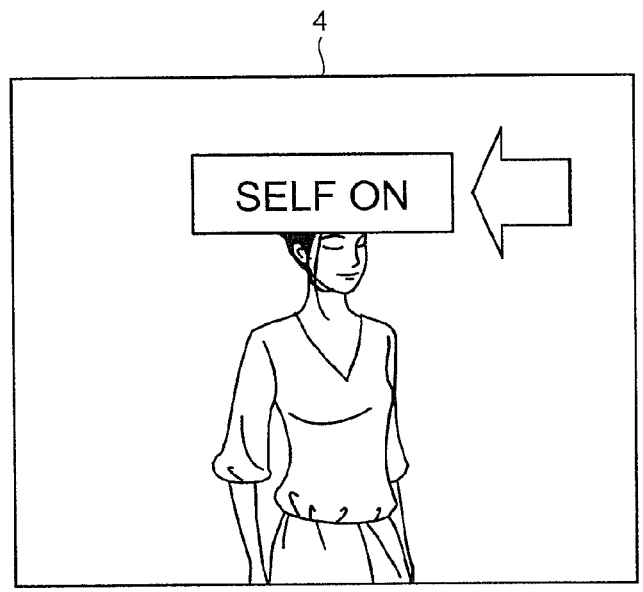
FIG. 13 is a diagram showing a display example of a display unit when the photographer taps a side surface of the imaging apparatus according to the second embodiment of the present invention.

For example, as shown in FIG. 8, when the photographer taps a side surface of the imaging apparatus 21, the power supply of the imaging apparatus 21 may be automatically turned on. FIG. 13 is a diagram showing a display example of the display unit 4 when the photographer taps a side surface of the imaging apparatus 21 under the setting. In FIG. 13, the display unit 4 displays thereon a message of "self ON" indicating that the power supply has been automatically turned on, and a leftward arrow in addition to a through image.

Figure 14:
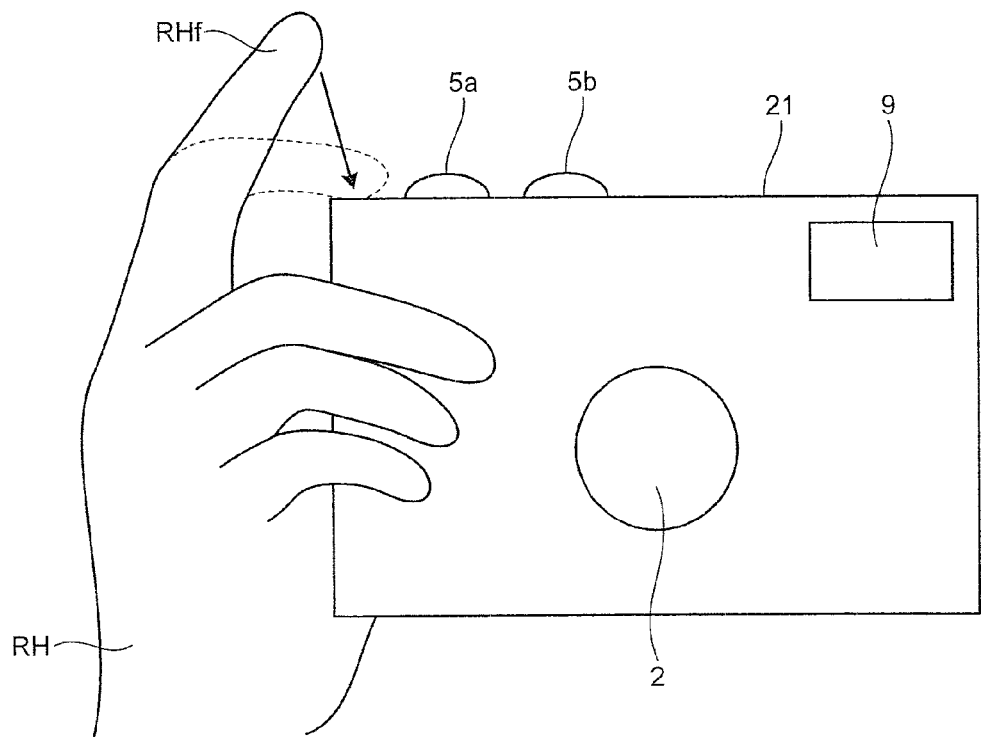
FIG. 14 is a diagram showing a situation in which the photographer taps the top surface of the imaging apparatus according to the second embodiment of the present invention.
Figure 15:
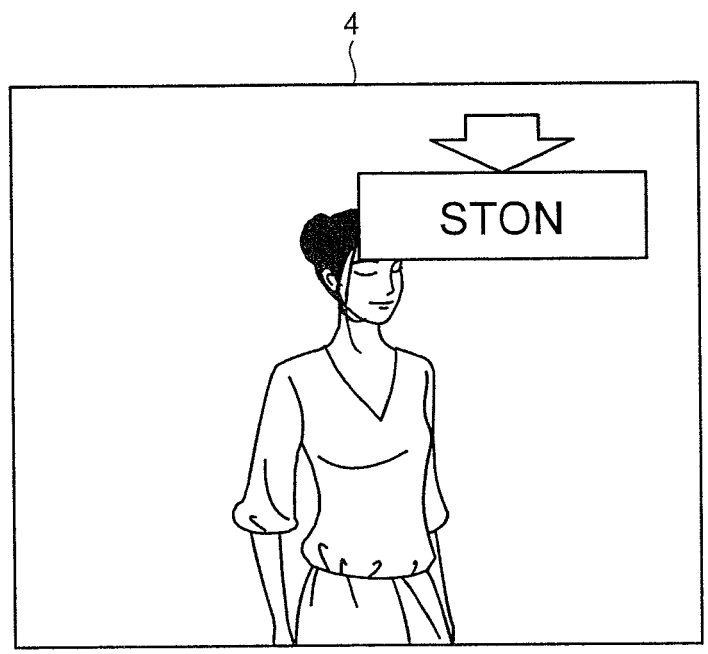
FIG. 15 is a diagram showing a display example of the display unit in the imaging apparatus according to the second embodiment of the present invention when auxiliary light projection is set by an auxiliary light projector during shooting.

As shown in FIG. 14, the imaging apparatus 21 may be set such that when the top surface of the imaging apparatus 21 is tapped by the forefinger RHf, the auxiliary light projector 9 projects an auxiliary light during shooting. FIG. 15 is a diagram showing a display example of the display unit 4 when the projection of an auxiliary light by the auxiliary light projector 9 is set during shooting. In FIG. 15, the display unit 4 display thereon a message of "STON" indicating that the auxiliary light projector 9 projects an auxiliary light during shooting, and a downward arrow in addition to a through-image.

Third Embodiment

Figure 16:
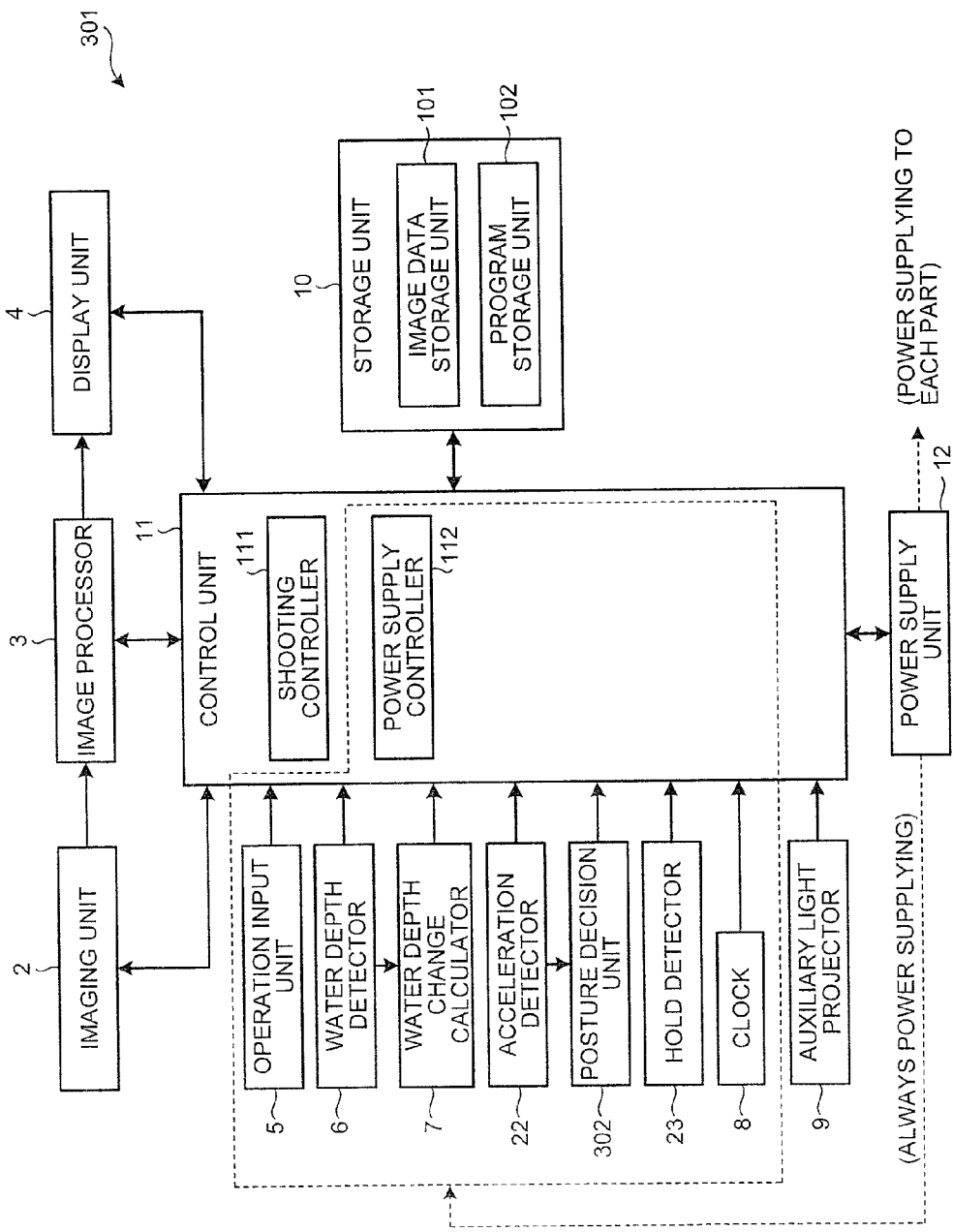
FIG. 16 is a block diagram showing a configuration of an imaging apparatus according to a third embodiment of the present invention.

FIG. 16 is a block diagram showing a configuration of an imaging apparatus according to a third embodiment of the present invention. An imaging apparatus 301 shown in FIG. 16 includes the imaging unit 2, the image processor 3, the display unit 4, the operation input unit 5, the water depth detector 6, the water depth change calculator 7, the clock 8, the auxiliary light projector 9, the storage unit 10, the control unit 11, the acceleration detector 22 and the hold detector 23. The imaging apparatus 301 includes a posture decision unit 302 for deciding a posture of the imaging apparatus 301 based on a detection result of a gravity acceleration by the acceleration detector 22. The same parts as those of the imaging apparatus 1 are denoted with the same numerals.

In the third embodiment, the water depth detector 6 functions as a second state detector for discriminating the underwater imaging unit 2 from the overland imaging unit 2.

Figure 17:
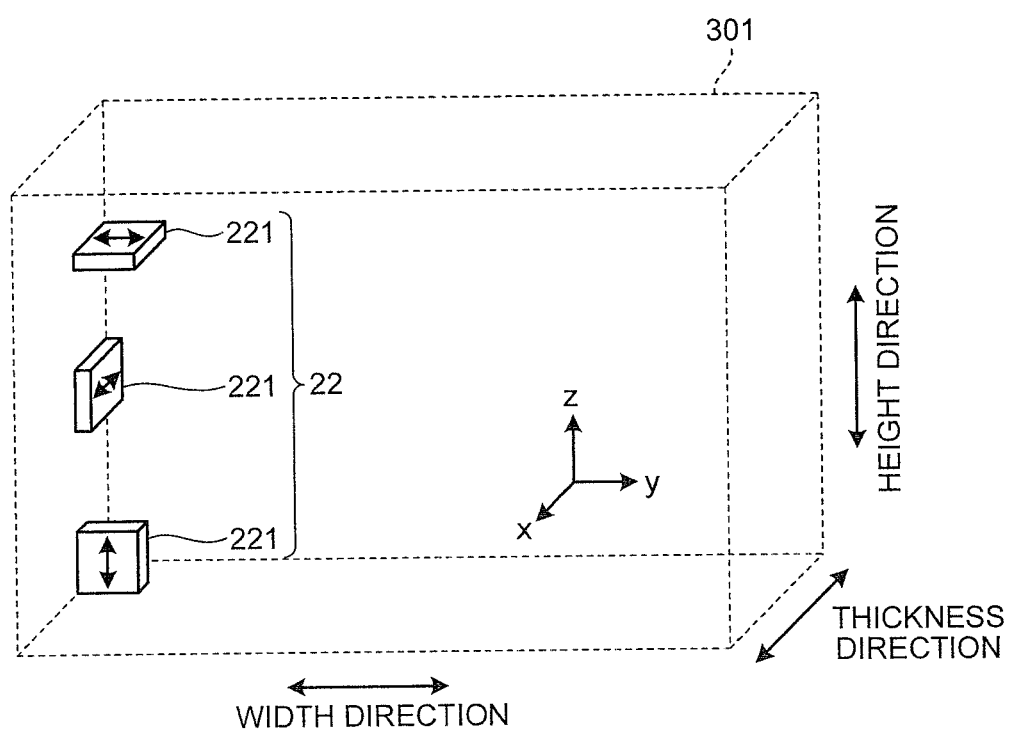
FIG. 17 is a diagram schematically showing a configuration of an acceleration detector in the imaging apparatus according to the third embodiment of the present invention.

The acceleration detector 22 includes the three acceleration sensors 221 the acceleration detecting directions of which are orthogonal to each other. In the third embodiment, as shown in FIG. 17, the coordinate system specific to the imaging apparatus 301 (which will be referred to as "imaging coordinate system" below) employs the x-axis parallel to the thickness direction of the imaging apparatus 301, the y-axis parallel to the width direction of the imaging apparatus 301 and the z-axis parallel to the height direction of the imaging apparatus 301, and the three acceleration sensors 221 for detecting the acceleration components in the respective axial directions are attached to predetermined positions of the main body of the imaging apparatus 301.

The posture decision unit 302 is configured in a combination of comparator and logic circuit, for example. The posture decision unit 302 is provided so that the power-on operation can be realized based on a change in posture of the imaging apparatus 301 overland, as described later. The posture decision unit 302 may be realized as part of the control unit 11.

The power supply unit 12 always supplies power to the operation input unit 5, the water depth detector 6, the water depth change calculator 7, the clock 8, the acceleration detector 22, the hold detector 23, the power supply controller 112 and the posture decision unit 302 irrespective of whether the imaging apparatus 301 has been activated by the power supply switch. In other words, in the third embodiment, the operation input unit 5, the water depth detector 6, the water depth change calculator 7, the clock 8, the acceleration detector 22, the hold detector 23, the power supply controller 112 and the posture decision unit 302 correspond to the always-on parts.

The above-configured imaging apparatus 301 has on its exterior a waterproof casing whose surfaces are tightly sealed like the imaging apparatus 1.

Figure 18:
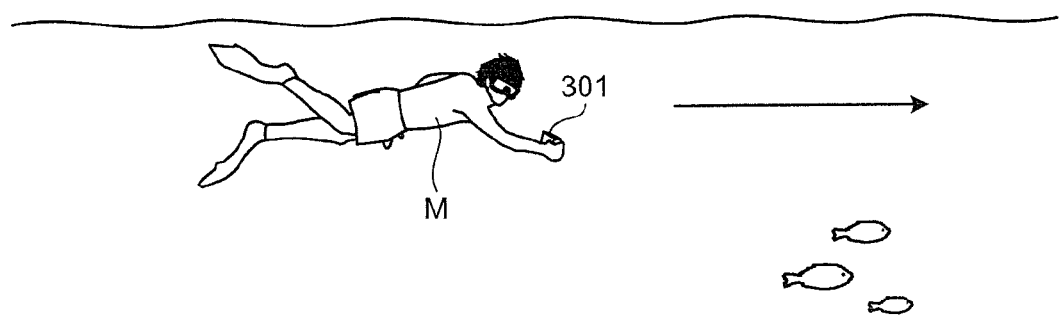
FIG. 18 is a diagram showing a situation in which the photographer uses the imaging apparatus according to the third embodiment of the present invention to shoot while swimming immediately below the water surface.

As shown in FIG. 2, the imaging apparatus 301 is characterized by the processes when the photographer M shoots underwater while skin diving. Further, as shown in FIG. 18, the imaging apparatus 301 is characterized by the processes when the photographer M shoots while swimming immediately below the water surface, which are different from the underwater shooting.

Figure 19:
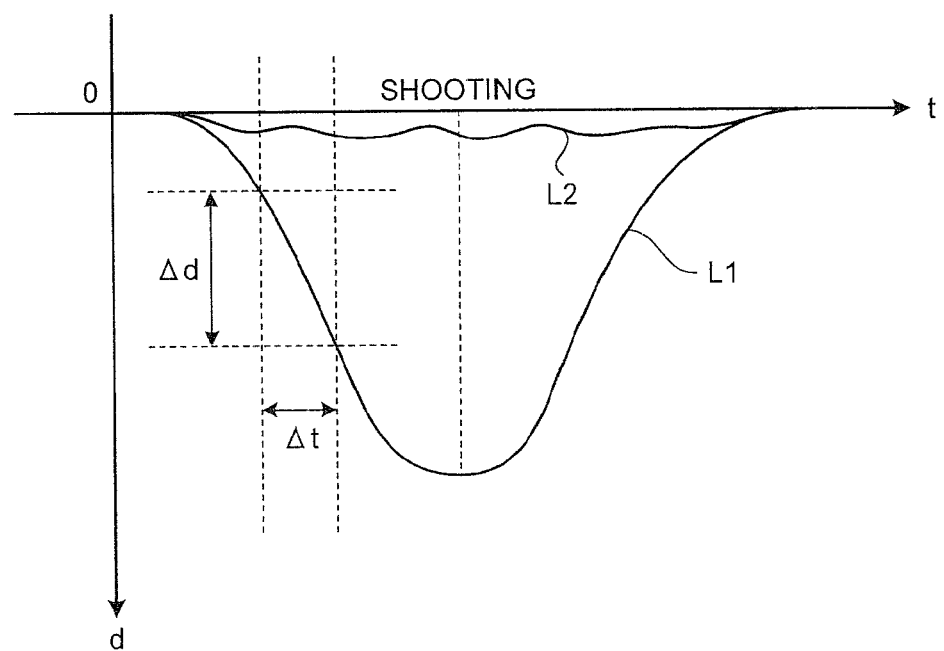
FIG. 19 is a diagram showing a temporal water depth change of the imaging apparatus when the photographer uses the imaging apparatus according to the third embodiment of the present invention to shoot underwater.

FIG. 19 is a diagram showing a temporal change in water depth of the imaging apparatus 301. In FIG. 19, the horizontal axis t indicates time and the vertical axis d indicates water depth. A curved line L1 indicated in FIG. 19 is the same as the curved line L shown in FIG. 3, and indicates a temporal change in water depth of the imaging apparatus 301 under the situation shown in FIG. 2. A curved line L2 in FIG. 19 indicates a temporal change in water depth of the imaging apparatus 301 when the photographer M is swimming immediately below the water surface as shown in FIG. 18. As indicated by the curved line L2, when the photographer M is swimming immediately below the water surface, the water depth d of the imaging apparatus 301 is substantially constant irrespective of elapsed time.

Like the imaging apparatus 1, the imaging apparatus 301 reduces the exposure time and enhances the gain thereby to improve the sensitivity since the photographer easily reels underwater. With the controlling, the photographer, who cannot freely move underwater and can barely adjust the shooting timing, can accurately shoot a desired subject.

Figure 20:
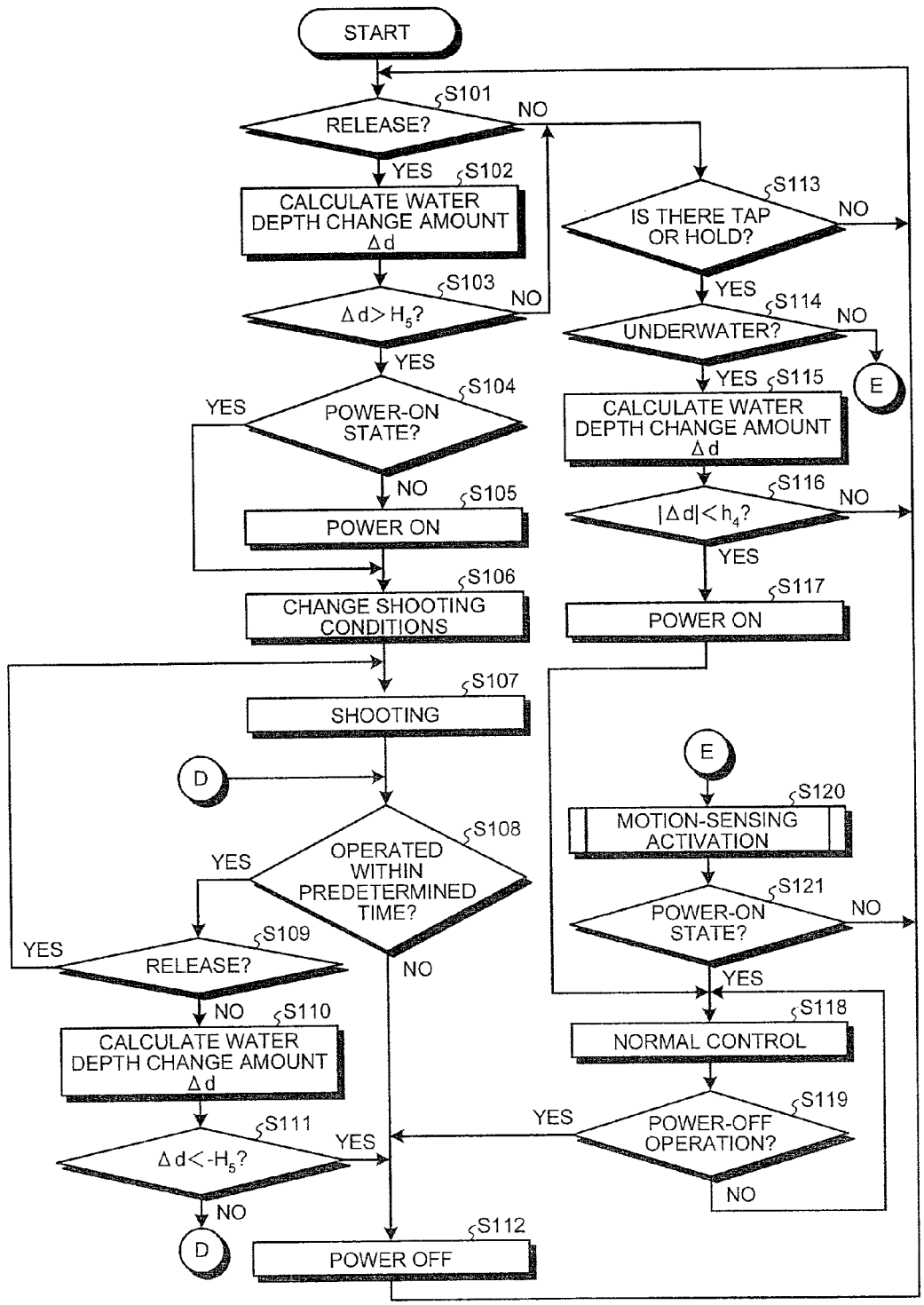
FIG. 20 is a flowchart showing an outline of processes to be performed by the imaging apparatus according to the third embodiment of the present invention.

FIG. 20 is a flowchart showing an outline of processes to be performed by the imaging apparatus 301. In FIG. 20, when the release switch 5a of the operation input unit 5 is operated (step S101: Yes), the water depth change calculator 7 calculates the amount of change Δd between the two latest water depths detected by the water depth detector 6 (step S102). As a result of the calculation by the water depth change calculator 7, when the amount of change Δd in water depth is larger than a fifth threshold $H_5$ (>0) (step S103: Yes), and the imaging apparatus 301 is not powered on (step S104: No), the power supply controller 112 controls the power supply unit 12 to turn on (step S105). The fifth threshold $H_5$ may be a value of about 1 m. A detection period Δt of the water depth detector 6 may be about 2 seconds.

When the imaging apparatus 301 is powered on in step S104 (step S104: Yes), the imaging apparatus 301 proceeds to step S106 described later.

The shooting controller 111 changes the shooting conditions (step S106) and then the powered-on imaging apparatus 301 causes the imaging unit 2 to shoot (step S107). Specifically, the shooting controller 111 sets the exposure time of the imaging unit 2 to be shorter than the initial setting and enhances the gain of the imaging unit 2 as compared with the initial setting, and then controls the imaging unit 2 to continuously take a predetermined number (such as five) of photos serially. At this time, if the shooting controller 111 causes the auxiliary light projector 9 to project an auxiliary light, a red-color component, which is easily lost underwater, can be compensated and a vivid image can be shot, which is preferable.

Thereafter, when the operation input unit 5 is operated within a predetermined time (such as one minute) (step S108: Yes) and the operation is by the release switch 5a (step S109: Yes), the imaging apparatus 301 returns to step S107. On the other hand, when the operation by the operation input unit 5 is not by the release switch 5a (step S109: No), the water depth change calculator 7 uses the two latest detection results by the water depth detector 6 to calculate the amount of change Δd in water depth (step S110), and when the calculation result is smaller than a predetermined value $-H_5$ (sixth threshold) (step S111: Yes), the power supply controller 112 controls the power supply unit 12 to turn off (step S112). As far as the sixth threshold has a different sign from the fifth threshold $H_5$, they do not have to have the same absolute value. The imaging apparatus 301 performs step S112 and then returns to step S101.

When the operation input unit 5 is not operated within a predetermined time in step S108 (step S108: No), the imaging apparatus 301 proceeds to step S112.

When the amount of change Δd in water depth is equal to or more than the sixth threshold $-H_5$ in step S111 (step S111: No), the imaging apparatus 301 returns to step S108.

There will be described below a case in which the release switch 5a is not pressed in step S101 (step S101: No) and the amount of change Δd in water depth is equal to or less than the fifth threshold $H_5$ in step S103 (step S103: No). In the case, when the acceleration detector 22 detects a tap or the hold detector 23 detects a hold (step S113: Yes), and the latest value detected by the water depth detector 6 can be regarded as underwater (step S114: Yes), the water depth change calculator 7 calculates the amount of change Δd between the two latest water depths detected by the water depth detector 6 (step S115).

As a result of the calculation of the amount of change Δd in water depth by the water depth change calculator 7, when the absolute value |Δd| is smaller than the fourth threshold $h_4$ ($0<h_4<H_5$) at which the water depth can be regarded substantially constant (step S116: Yes), the power supply controller 112 controls the power supply unit 12 to turn on (step S117). On the other hand, when the absolute value |Δd| is equal to or more than the fourth threshold $h_4$ (step S116: No), the imaging apparatus 301 returns to step S101. The fourth threshold $h_4$ is about 30 to 50 cm, for example.

After step S117, the control unit 11 performs normal control (step S118).

Subsequently, when the power supply is turned off (step S119: Yes), the imaging apparatus 301 proceeds to step S112. On the other hand, when the power supply is not turned off (step S119: No), the imaging apparatus 301 continues normal control (step S118).

There will be described below a case in which the value of the latest detection result by the water depth detector 6 is not regarded as underwater (step S114: No). In this case, the imaging apparatus 301 performs a motion-sensing activation process for turning on the power supply when a predetermined posture change is detected (step S120). The motion-sensing activation process will be described below in detail.

After the motion-sensing activation process in step S120, when the imaging apparatus 301 is in the power-on state (step S121: Yes), the imaging apparatus 301 proceeds to step S118. On the other hand, after the motion-sensing activation process in step S120, when the imaging apparatus 301 is not in the power-on state (step S121: No), the imaging apparatus 301 returns to step S101.

Figure 21:
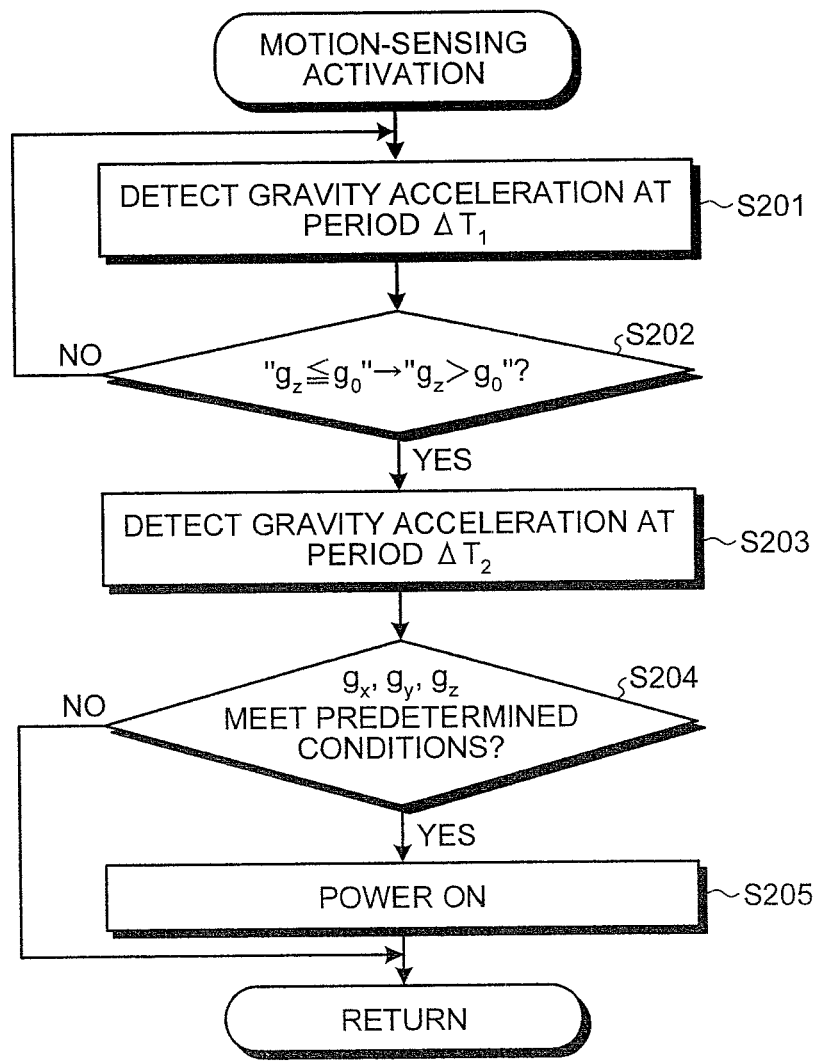
FIG. 21 is a diagram showing an outline of a motion-sensing activation process to be performed by the imaging apparatus according to the third embodiment of the present invention.

The motion-sensing activation process will be described below in detail. FIG. 21 is a flowchart showing an outline of the motion-sensing activation process in step S120. In FIG. 21, the acceleration detector 22 detects a gravity acceleration ($g_x$, $g_y$, $g_z$) in the imaging coordinate system at a period $\Delta T_1$ (step S201). The period $\Delta T_1$ may be about 1 second, for example.

As a result of the detection of the gravity acceleration in the imaging coordinate system by the acceleration detector 22, when a relationship between the gravity acceleration $g_z$ in the z-axis direction and the predetermined value $g_o$ changes from "$g_z \leq g_o$" to "$g_z > g_o$" (step S202: Yes), the control unit 11 changes the period at which the acceleration detector 22 detects the gravity acceleration to $\Delta T_2$ shorter than $\Delta T_1$, and causes the acceleration detector 22 to detect the gravity acceleration at the changed period $\Delta T_2$ (step S203). The period $\Delta T_2$ may be about 1/50 seconds, for example. The predetermined value $g_0$ corresponds to a gravity value when an angle formed between one axis in the imaging coordinate system and the vertical direction is smaller than a predetermined angel (such as about 45 to 60 degrees), and is a value at which the gravity acceleration in the axial direction cannot be ignored.

On the other hand, as a result of the detection of the gravity acceleration in the imaging coordinate system by the acceleration detector 22, when the relationship between the gravity acceleration $g_z$ in the z-axis direction and the predetermined value $g_0$ remains "$g_z \leq g_0$" (step S202: No), the imaging apparatus 301 returns to step S201.

After the detection period of the acceleration detector 22 is changed from $\Delta T_1$ to $\Delta T_2$ in step S203, the posture decision unit 302 decides whether the gravity acceleration ($g_x$, $g_y$, $g_z$)

meets a predetermined condition (step S204). The predetermined condition is concerned with a temporal change in gravity acceleration ($g_x$, $g_y$, $g_z$). For example, the predetermined condition may be "after each component of the gravity acceleration is detected predetermined number of times, the detected value is within a predetermined range". When a vibration pattern is found in the temporal change in each component of the gravity acceleration, the period of the vibration may be assumed as the predetermined condition.

When the gravity acceleration ($g_x$, $g_y$, $g_z$) meets the predetermined condition (step S204: Yes), the power supply controller 112 controls the power supply unit 12 to turn on (step S205). Thereafter, the imaging apparatus 301 returns to the main routine and proceeds to step S121.

To the contrary, when the gravity acceleration ($g_x$, $g_y$, $g_z$) does not meet the predetermined condition in step S204 (step S204: No), the imaging apparatus 301 returns to the main routine and proceeds to step S121.

Figure 22:
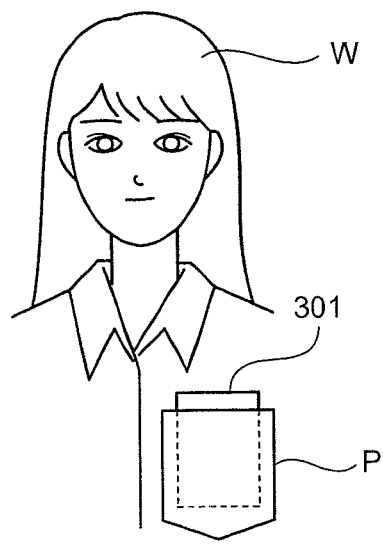
FIG. 22 is a diagram showing a situation in which the photographer puts the imaging apparatus according to the third embodiment of the present invention into his/her shirt breast pocket.
Figure 23:
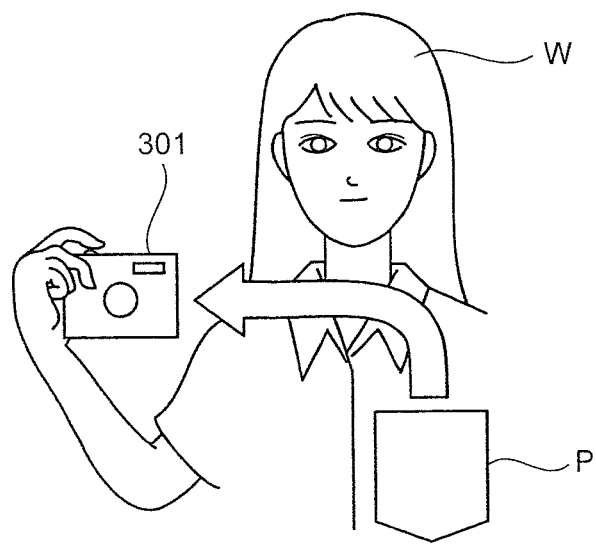
FIG. 23 is a diagram showing a situation in which the photographer takes the imaging apparatus according to the third embodiment of the present invention out of his/her shirt breast pocket and is ready to shoot.

FIGS. 22 and 23 are diagrams showing a situation in which the imaging apparatus 301 is activated by the motion-sensing activation process. Specifically, FIG. 22 shows a situation in which a photographer W is walking with the imaging apparatus 301 put in a shirt pocket P and FIG. 23 shows a situation in which the photographer W takes the imaging apparatus 301 out of the shirt pocket P and is ready to shoot.

When the photographer W is walking with the imaging apparatus 301 in the shirt pocket P, the width direction (corresponding to the y-axis direction of FIG. 17) is substantially parallel to the vertical direction, only the y component $g_y$ of the gravity acceleration in the imaging coordinate system shown in FIG. 17 has a value larger than the predetermined value $g_0$. To the contrary, when the photographer W holds the imaging apparatus 301 as shown in FIG. 23, the height direction (corresponding to the z-axis direction of FIG. 17) is substantially parallel to the vertical direction, only the z component $g_z$ of the gravity acceleration in the imaging coordinate system has a value larger than the predetermined value $g_0$.

Figure 24:
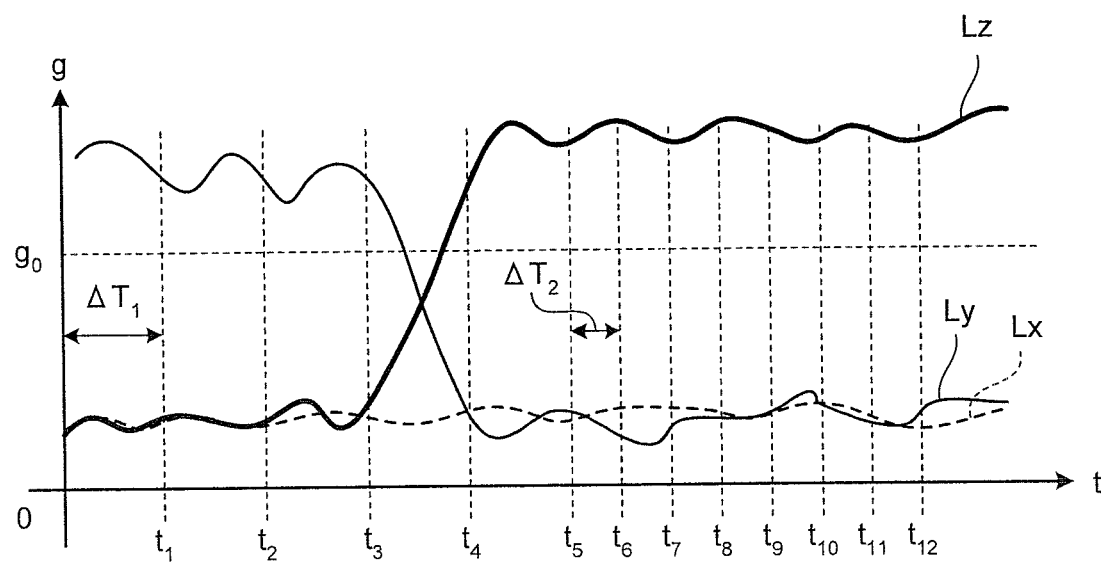
FIG. 24 is a diagram showing a temporal change in gravity acceleration per component in a coordinate system specific to the imaging apparatus when the imaging apparatus changes from the situation in FIG. 22 to the situation in FIG. 23.

FIG. 24 is a diagram showing a temporal change in gravity acceleration ($g_x$, $g_y$, $g_z$) when the imaging apparatus changes from the state shown in FIG. 22 to the state shown in FIG. 23. In FIG. 24, the horizontal axis t indicates time and the vertical axis g indicates a magnitude of the gravity acceleration. A curved line $L_x$ (indicated by dashed line), $L_y$ (indicated by solid line) and $L_z$ (indicated by bold line) shown in FIG. 24 indicate the temporal changes in the x component $g_x$, the y component $g_y$, and the z component $g_z$ of the gravity acceleration applied to the imaging apparatus 301, respectively. When the imaging apparatus 301 is in the shirt pocket P of the photographer W, only the gravity acceleration $g_y$ in the y-axis direction in the imaging coordinate system is larger than the predetermined value $g_0$, and other components have the values smaller than the predetermined value $g_0$, respectively. To the contrary, when the photographer W holds the imaging apparatus 301 while being ready to shoot, only the gravity acceleration $g_z$ in the z-axis direction is larger than the predetermined value $g_0$, and other components are smaller than the predetermined value $g_0$. FIG. 24 shows a case in which the imaging apparatus 301 is taken out of the shirt pocket P between time $t_3$ and time $t_4$.

According to the third embodiment of the present invention described above, when the tap operation or hold operation is detected underwater, and the water depth does not change so much, power supplying is started to the entire imaging apparatus and thus the power supply can be easily turned on under an appropriate condition during underwater shooting.

According to the third embodiment, when the water depth is substantially constant and the tap operation or hold operation is detected, it is recognized that the photographer positively instructs the imaging apparatus 301 to start the operation, and the power supply is turned on, and thus the operation can be more rapidly performed than pressing a small switch.

According to the third embodiment, since the imaging apparatus 301 is configured such that when the release switch is pressed while the water depth becomes rapidly larger due to diving, shooting is continuously performed predetermined number of times, a desired image is likely to be found in the continuously-shot images even if the photographer is concentrating hard on swimming. Thus, the photographer can easily shoot while diving and is likely to obtain desired images.

According to the third embodiment, since the power supply is turned off whenever the photographer emerges underwater or the release signal is not input, the battery can last long.

When the photographer uses the imaging apparatus 301 overland, the normal control may be performed to switch still image shooting and moving picture shooting through the switch operation.

Fourth Embodiment

An imaging apparatus according to a fourth embodiment of the present invention is characterized by switching the shooting mode depending on a holding form while the photographer is swimming immediately below the water surface. A configuration of the imaging apparatus according to the fourth embodiment is the same as the configuration of the imaging apparatus 301 described in the third embodiment. The imaging apparatus according to the fourth embodiment will be referred to as an imaging apparatus 301.

In the fourth embodiment, like the second embodiment, still image shooting or moving picture shooting is selected based on the characteristics (see FIG. 11) of the usage situation of the imaging apparatus 301, and thus the switch operation is defined. Specifically, when the photographer shoots underwater while skin diving (see FIG. 2), the imaging apparatus 301 changes the shooting conditions such as exposure and gain, and continuously shoots. When the photographer is swimming immediately below the water surface (see FIG. 18), the imaging apparatus 301 does the still image shooting when the photographer M holds the imaging apparatus 301 with both hands, and does the moving picture shooting when the photographer holds the imaging apparatus 301 with either hand.

Figure 25:
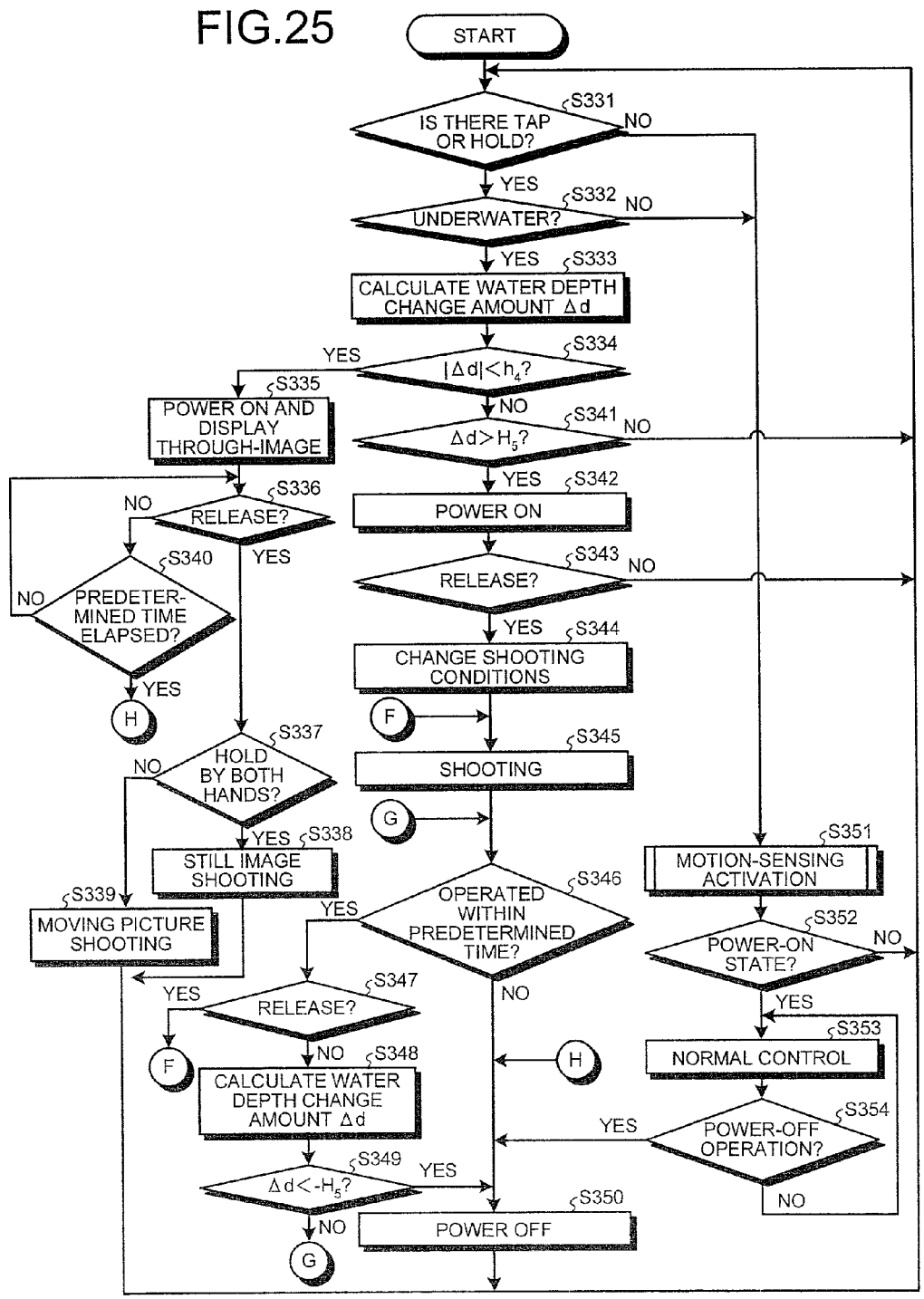
FIG. 25 is a flowchart showing an outline of processes to be performed by an imaging apparatus according to a fourth embodiment of the present invention.

FIG. 25 is a flowchart showing an outline of processes to be performed by the imaging apparatus 301. FIG. 25 shows a case in which the acceleration detector 22 detects a tap or the hold detector 23 detects a hold (step S331: Yes). In this case, when the water depth change calculator 7 refers to the result detected by the water depth detector 6 and a value of the latest detection result can be regarded as underwater (step S332: Yes), the water depth change calculator 7 calculates the amount of change Δd between the two latest water depths detected by the water depth detector 6 (step S333).

As a result of the calculation of the amount of change Δd in water depth by the water depth change calculator 7, when the absolute value |Δd| is smaller than the first threshold h and the water depth can be regarded as constant (step S334: Yes), the power supply controller 112 controls the power supply unit 12 to turn on and the display unit 4 displays the image captured by the imaging unit 2 as through-image (step S335). Thereafter, when the release switch 5a of the operation input unit 5 is operated (step S336: Yes), the processes are differently performed depending on the detection result by the hold detector 23. Specifically, as a result of the detection by the hold detector 23, when the imaging apparatus 301 is held by both hands (step S337: Yes), the imaging apparatus 301 performs the still image shooting (step S338) and returns to step S331. To the contrary, as a result of the detection by the hold detector 23, when the imaging apparatus 301 is held by either hand (step S337: No), the imaging apparatus 301 performs the moving picture shooting (step S339) and returns to step S331.

When the release switch 5a is not operated in step S336 (step S336: No), and a predetermined time has not elapsed after the power-on in step S335 (step S340: No), the imaging apparatus 301 returns to step S336. On the other hand, when a predetermined time has elapsed after the power-on in step S335 (step S340: Yes), the imaging apparatus 301 proceeds to step S350 described later.

There will be described below a case in which the absolute value |Δd| of the amount of change in water depth is equal to or more than the fourth threshold $h_4$ in step S334 (step S334: No). In this case, when the amount of change Δd in water depth is larger than the fifth threshold $H_5$ (step S341: Yes), the power supply controller 112 turns on the power supply (step S342). Thereafter, when the release switch 5a is operated (step S343: Yes), the shooting controller 111 changes the shooting conditions (step S344) and then causes the imaging unit 2 to shoot (step S345). The specific process contents by the shooting controller 111 are the same as those in the third embodiment.

When the amount of change Δd in water depth is equal to or less than the fifth threshold $H_5$ in step S341 (step S341: No) and the release switch 5a is not operated in step S343 (step S343: No), the imaging apparatus 301 returns to step S331.

Steps S346 to S350 subsequent to step S345 sequentially correspond to steps S108 to S112 in FIG. 20.

There will be described below a case in which the acceleration detector 22 detects no tap and the hold detector 23 detects no hold in step S331 (step S331: No) and a case in which the latest detection result by the water depth detector 6 cannot be regarded as underwater in step S332 (step S332: No). In the cases, the imaging apparatus 301 proceeds to the motion-sensing activation process (step S351). The details of the motion-sensing activation process are the same as those in the third embodiment (see FIG. 21).

After the motion-sensing activation process, when the imaging apparatus 301 is in the power-on state (step S352: Yes), the imaging apparatus 301 performs normal control (step S353). On the other hand, when the imaging apparatus 301 is not in the power-on state (step S352: No), the imaging apparatus 301 returns to step S331.

Subsequent to step S353, when the power supply is turned off by the operation input unit 5 (step S354: Yes), the imaging apparatus 301 proceeds to step S350. On the other hand, when the power supply is not turned off (step S354: No), the imaging apparatus 301 continues normal control (step S353).

According to the fourth embodiment of the present invention described above, since the imaging apparatus is configured such that if the release switch is pressed when the water depth is rapidly changing due to diving, shooting is continuously performed predetermined number of times, a desired image is likely to be found in the continuously-shot images even if the photographer is concentrating hard on swimming. Thus, the photographer can easily shoot while diving, and is likely to obtain desired images.

According to the fourth embodiment, when the tap operation or hold operation is detected underwater, and the water depth changes very little, power supplying is started to the entire imaging apparatus and thus the power supply can be easily turned on under an appropriate condition during underwater shooting.

According to the fourth embodiment, when the tap operation or hold operation is detected at a constant water depth, it is recognized that the photographer positively instructs the imaging apparatus to start the operation, and the power supply is turned on, and thus the operation can be more rapidly performed than pressing a small switch.

According to the fourth embodiment, since the power supply is turned off whenever the photographer emerges underwater or the release signal is not input, the battery can last long.

According to the fourth embodiment, since still image shooting and moving picture shooting are switched depending on a holding form of the imaging apparatus by the underwater photographer, optimal control can be performed depending on the underwater situation of the photographer.

In the third and fourth embodiments of the present invention described above, the photographer may shake the imaging apparatus to perform part of the switch operations.

Fifth Embodiment

Figure 26:
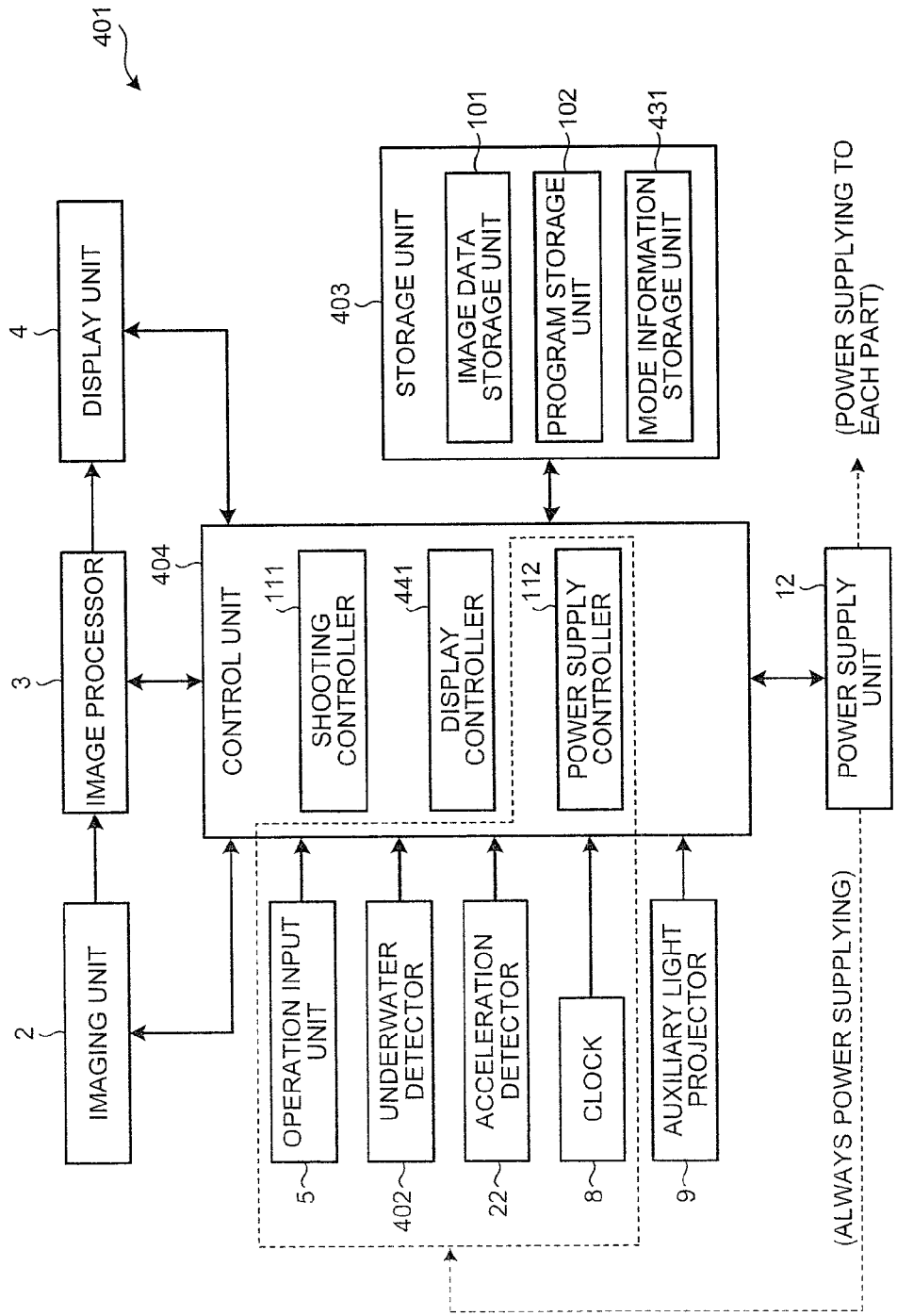
FIG. 26 is a block diagram showing a configuration of an imaging apparatus according to a fifth embodiment of the present invention.

FIG. 26 is a block diagram showing a configuration of an imaging apparatus according to a fifth embodiment of the present invention. The imaging apparatus 401 shown in FIG. 26 includes the imaging unit 2, the image processor 3, the display unit 4, the operation input unit 5, the clock 8, the auxiliary light projector 9, the power supply unit 12, the acceleration detector 22, an underwater detector 402 as a state detector for detecting whether the imaging apparatus 401 is underwater, a storage unit 403 for storing therein various items of information including image data processed by the image processor 3, and a control unit 404 for controlling the operations of the imaging apparatus 401 depending on the operation signals input by the operation input unit 5.

The underwater detector 402 is realized by a water pressure sensor, for example, and detects a water pressure applied to the imaging apparatus 401 to detect whether the imaging apparatus 401 is underwater. The water pressure detected by the water pressure sensor is about 1060 hPa at a water depth of 50 cm, and becomes larger as the water depth is more. The underwater detector 402 can be realized by a water detection switch which is in a state of conduction by water between two electrodes.

The storage unit 403 includes the image data storage unit 101, the program storage unit 102, and a mode information storage unit 431 for storing therein information on operation modes set by the imaging apparatus 401. The storage unit 403 is realized by a semiconductor memory such as flash memory or RAM fixedly provided inside the imaging apparatus 401. The storage unit 403 may function as a recording medium interface for recording information in an externally-mounted recording medium such as memory card and reading out information recorded in the recording medium.

The control unit 404 includes the shooting controller 111, the power supply controller 112, and a display controller 441 for controlling a display in the display unit 4. The control unit 404 is realized by a CPU, and is connected to the respective parts in the imaging apparatus 401 via a bus line.

The power supply unit 12 is always supplying power to the operation input unit 5, the clock 8, the acceleration detector 22, the power supply controller 112 and the underwater detector 402 irrespective of whether the imaging apparatus 401 has been activated by the power supply switch. Thus, the operation input unit 5, the clock 8, the acceleration detector 22, the power supply controller 112 and the underwater detector 402 are always being activated.

The above-configured imaging apparatus 401 has on its exterior a waterproof casing whose surfaces are tightly sealed like the imaging apparatus 1.

FIG. 27 is a diagram showing an operation's difficulty level and a necessity for play mode of the imaging apparatus in underwater shooting and overland shooting. Typically, the switches other than the release switch are closely arranged in the imaging apparatus and their operations are more complicated than the release switch. Thus, it is difficult to operate underwater the switches other than the release switch in the imaging apparatus. The play mode does not need to be used during underwater shooting. It is not easy to finely adjust exposure or focus underwater. In the imaging apparatus, the number of operations capable of being easily performed underwater is less than that of the overland operations. If various switches provided in the imaging apparatus are operable like overland, an unstable posture can cause erroneous operations underwater.

In the fifth embodiment, the individual switch operations other than the release switch 5a are performed by tapping the imaging apparatus 401 during underwater shooting in consideration of the difference between underwater shooting and overland shooting. In this case, since the tap operation is performed in the same manner, the setting of the operation modes (operation contents) is changed depending on the number of times of tapping. Specifically, there is performed an operation corresponding to a remainder obtained by dividing the number of times of tapping by a predetermined number.

FIG. 28 is a diagram showing the contents of the operation control by the control unit 404 depending on the number of times of tap operation in the underwater shooting mode. The information shown in FIG. 28 is stored in the mode information storage unit 431.

When the first tap operation is performed in the imaging apparatus 401, the control unit 404 turns on the power supply and sets the operation mode of the imaging apparatus 401 in the still image shooting mode.

When the second tap operation is performed in the imaging apparatus 401, the control unit 404 switches the operation mode to the strobe-on mode in which the auxiliary light projector 9 projects an auxiliary light during shooting.

When the third tap operation is performed in the imaging apparatus 401, the control unit 404 switches the operation mode to the strobe-off mode in which the auxiliary light projector 9 does not project an auxiliary light during shooting.

When the fourth tap operation is performed in the imaging apparatus 401, the control unit 404 switches the operation mode to the moving picture shooting mode.

When the fifth tap operation is performed in the imaging apparatus 401, the control unit 404 turns off the power supply.

For the sixth and subsequent tap operations in the imaging apparatus 401, the modes are set based on the number of times of operation corresponding to a remainder obtained by dividing the number of times of operation by a predetermined number of 5. For example, since a remainder obtained by dividing 6 by 5 is 1 when the sixth tap operation is performed, the power supply controller 112 turns on the power supply like when the first tap operation is performed, and the control unit 11 sets the operation mode in the still image shooting mode.

The correspondence between the number of times of tap operation and the operation control contents may be set by the user. For example, a list of operation contents including the operations shown in FIG. 28 is displayed by the display unit 4 and the number of times of tap operation corresponding to each operation may be set by user's writing in the operation input unit 5. A desired operation may be selected from the list of operation contents. The operation contents in the list may be rearranged. The instruction signals for writing, selecting and rearranging may be input through the arrow key or the touch panel provided in the operation input unit 5, for example.

Figure 29:
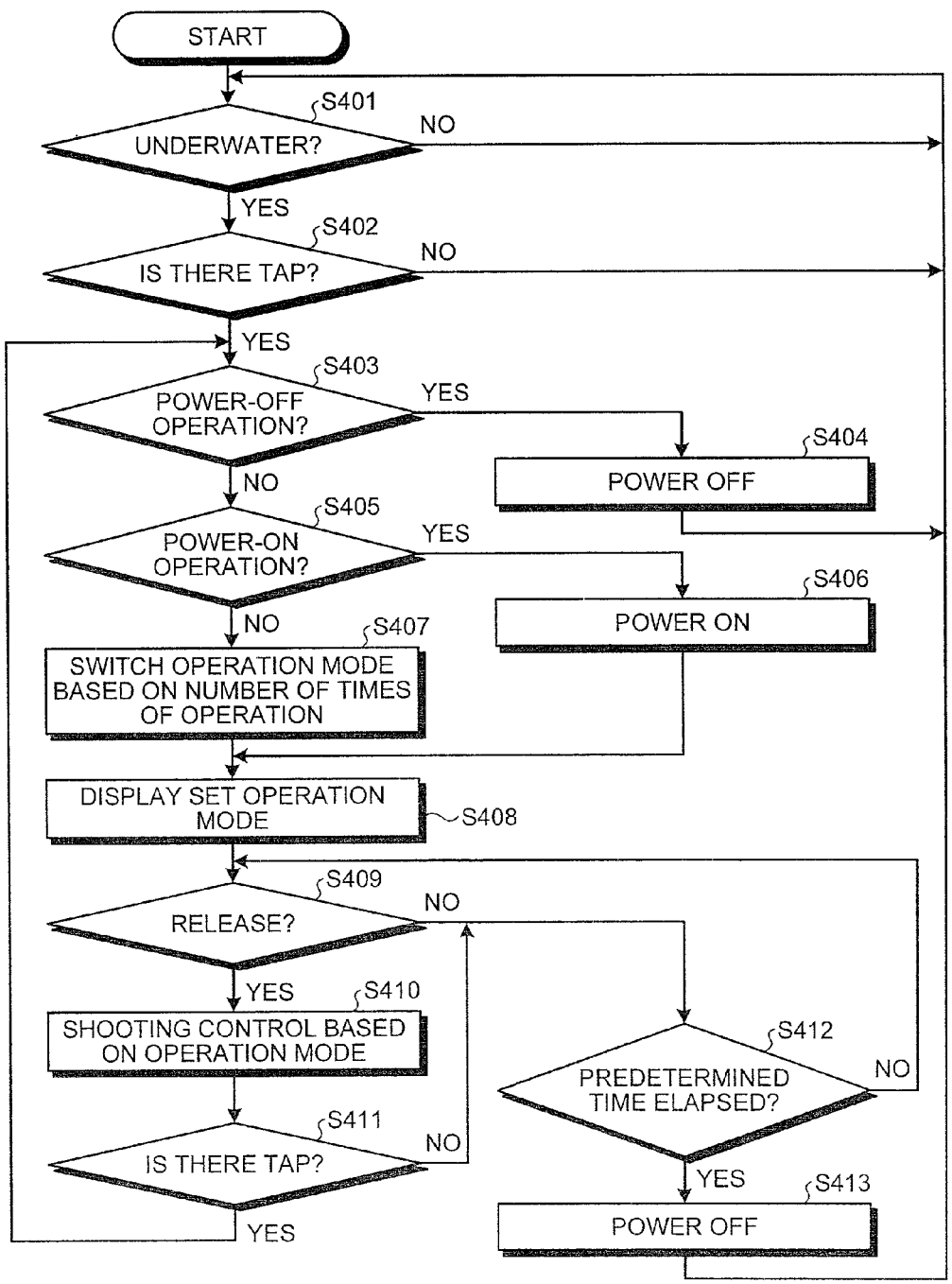
FIG. 29 is a flowchart showing an outline of processes when the imaging apparatus according to the fifth embodiment of the present invention is set in the underwater shooting mode.

FIG. 29 is a flowchart showing an outline of processes when the imaging apparatus 401 is set in the underwater shooting mode. When the underwater detector 402 decides that the imaging apparatus 401 is underwater (step S401: Yes) and when the acceleration detector 22 detects the tap operation (step S402: Yes), the control unit 11 switches the mode depending on the number of times of operation. The decision in step S401 can detect whether the imaging apparatus 401 is underwater. Additionally, step S401 may be configured to discriminate a case in which the imaging apparatus 401 is underwater and the photographer shoots while swimming from a case in which the imaging apparatus 401 is underwater and the photographer shoots while changing the water depth, and may be configured to decide, only while the photographer is swimming, that the imaging apparatus 401 is underwater. Thus, it is possible to prevent erroneous operations which can be caused by strenuous movement during diving.

When the tap operation detected by the acceleration detector 22 in step S402 is the power-off operation (corresponding to the fifth operation in FIG. 28) (step S403: Yes), the power supply controller 112 turns off the power supply (step S404) and returns to step S401.

When the tap operation detected by the acceleration detector 22 in step S402 is not the power-off operation (step S403: No) but the power-on operation (corresponding to the first operation) (step S405: Yes), the power supply controller 112 turns on the power supply (step S406) and proceeds to step S408 described later. On the other hand, when the tap operation in step S402 is not the power-on operation (step S405: No), the control unit 404 switches the operation mode depending on the number of times of operation (step S407). Specifically, the mode is switched to any one of the strobe-on mode (corresponding to the second operation), the strobe-off mode (corresponding to the third operation) and the moving picture shooting mode (corresponding to the fourth operation).

Figure 30:
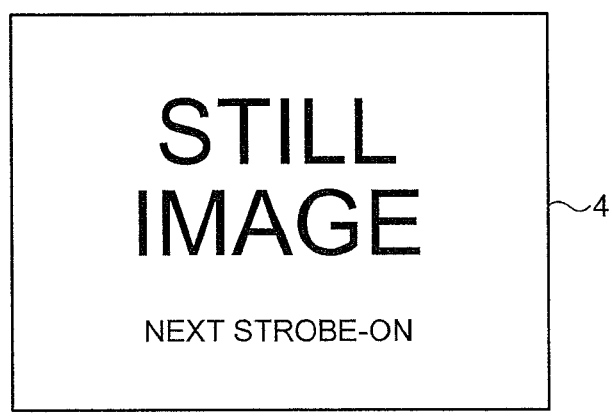
FIG. 30 is a diagram showing a display example of an operation mode in a display unit provided in the imaging apparatus according to the fifth embodiment of the present invention.

Subsequently, the display unit 4 displays the information on the operation modes set under control of the display controller 441 (step S408). FIG. 30 is a diagram showing the display contents of the display unit 4 in this case. The display unit 4 displays the operation mode in a single color and enlarges the textual information indicating the operation mode ("still image" in FIG. 30) as main information in consideration of underwater shooting. When the display unit 4 is realized by a liquid crystal display panel, a luminance of the liquid crystal backlight is preferably enhanced.

Figure 31:
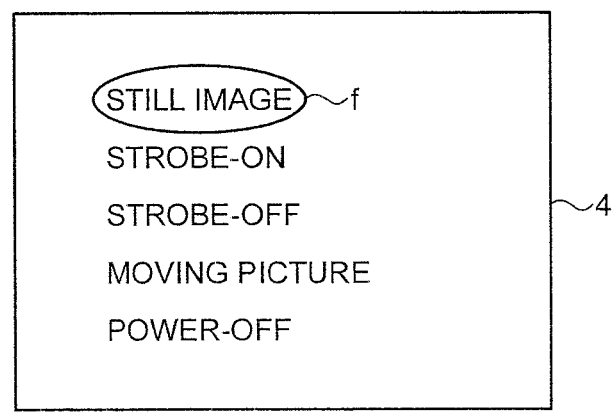
FIG. 31 is a diagram showing a display example (second example) of the operation modes in the display unit provided in the imaging apparatus according to the fifth embodiment of the present invention.

FIG. 31 is a diagram showing another display example of the display unit 4. As shown in FIG. 31, the display unit 4 can list the selectable modes and display the currently-selected display with a frame f in an emphasized manner. When the user can set the correspondence between the number of times of operation and the operation control contents, the list of operation contents can be displayed in the form shown in FIG. 31.

After step S408, when the release operation is performed (step S409: Yes), the shooting controller 111 performs shooting control depending on the set operation mode (step S410). Then, when the acceleration detector 22 detects the tap operation (step S411: Yes), the imaging apparatus 401 returns to step S403. On the other hand, when the acceleration detector 22 does not detect the tap operation (step S411: No), after a predetermined time has elapsed since the display of the operation mode by the display unit 4 (step S412: Yes), the power supply controller 112 controls the power supply unit 12 to turn off (step S413). Thereafter, the imaging apparatus 401 returns to step S401. If a predetermined time has not elapsed since the display of the operation mode by the display unit 4 (step S412: No), the imaging apparatus 401 returns to step S409.

When the release operation is not performed in step S409 (step S409: No), the imaging apparatus 401 proceeds to step S412.

When the underwater detector 402 decides that the imaging apparatus is not underwater in step S401 (step S401: No) and when the acceleration detector 22 does not detect the tap operation in step S402 (step S402: No), the imaging apparatus 401 returns to step S401.

According to the fifth embodiment of the present invention described above, the operation control is performed depending on a remainder obtained by dividing the number of times of detecting a predetermined underwater operation by a predetermined number, thereby simplifying the operations to be performed by the photographer. Thus, the operations during underwater shooting can be easily and accurately performed. Erroneous operations can be prevented underwater.

Figures 32, 33:
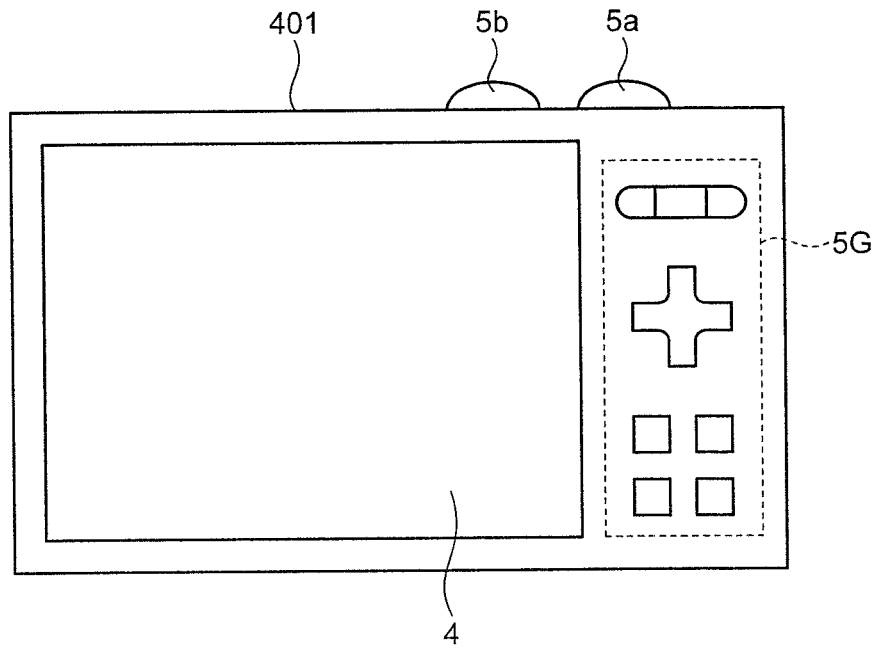
FIG. 32 is a diagram showing an outer configuration of the rear surface of the imaging apparatus according to the fifth embodiment of the present invention.
FIG. 33 is a diagram showing setting contents (second example) depending on the number of times of tapping when the imaging apparatus according to the fifth embodiment of the present invention is set in the underwater shooting mode.

In the fifth embodiment, the inputs through the operation switches other than the release switch 5a are all regarded as the same, and can be used instead of the tap input. FIG. 32 is a diagram showing an outer configuration of the rear surface of the imaging apparatus 401. The rear surface of the imaging apparatus 401 is provided with the display unit 4 and further a group of switches 5G made of various operation switches other than the release switch 5a. There may be configured such that when the imaging apparatus 401 is underwater, even if any of the various switches in the group of switches 5G is pressed, the same operation signal is considered being input and the mode is set depending on the number of times of operation based on the correspondence shown in FIG. 28. The input through the group of switches 5G and the input through tapping can be used together.

In the fifth embodiment, when the underwater shooting mode is set, the operation control contents of the control unit 404 based on the number of times of tap operation can be appropriately changed. FIG. 33 is a diagram showing other setting contents depending on the number of times of tap operation. FIG. 33 shows six setting patterns.

When the first tap operation is performed in the imaging apparatus 401, the control unit 404 turns on the power supply and sets the operation mode of the imaging apparatus 401 in the still image shooting mode.

When the second tap operation is performed in the imaging apparatus 401, the control unit 404 sets the operation mode in the macro mode.

When the third tap operation is performed in the imaging apparatus 401, the control unit 404 sets the operation mode in the closeup mode.

When the fourth tap operation is performed in the imaging apparatus 401, the control unit 404 sets the operation mode in the strobe-off mode.

When the fifth tap operation is performed in the imaging apparatus 401, the control unit 404 sets the operation mode in the moving picture shooting mode.

When the sixth tap operation is performed in the imaging apparatus 401, the control unit 404 turns off the power supply.

When the seventh and subsequent tap operations are performed in the imaging apparatus 401, the mode is set based on the number of times of operation corresponding to a remainder obtained by dividing the number of times of operation by 7.

Sixth Embodiment

A sixth embodiment of the present invention is configured such that the switches other than the release switch are disabled in the underwater shooting mode and are operated by pressing the release switch halfway. The configuration of the imaging apparatus according to the sixth embodiment is the same as the configuration of the imaging apparatus 401. The imaging apparatus according to the sixth embodiment will be referred to as an imaging apparatus 401 below.

Figure 34:
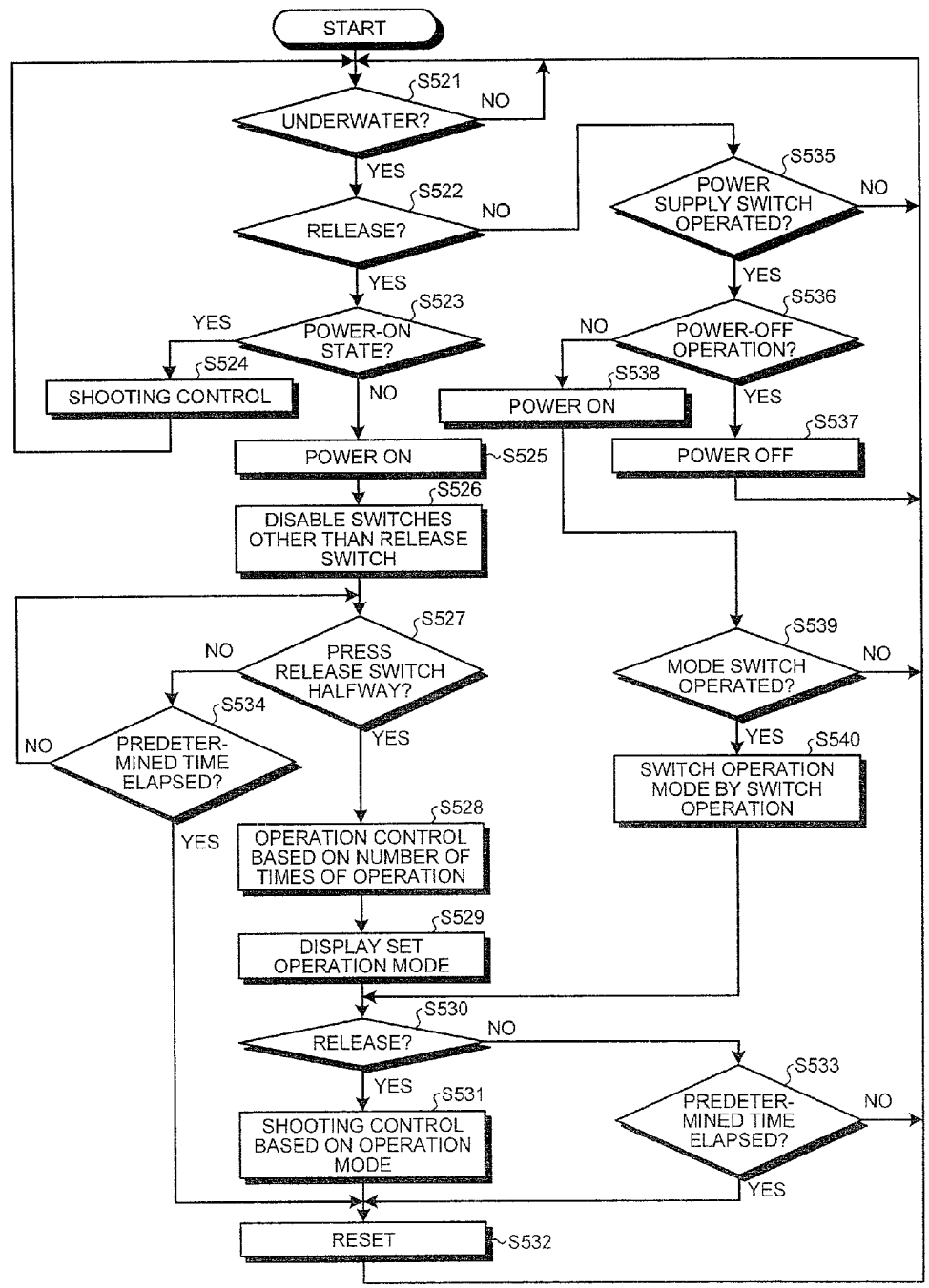
FIG. 34 is a flowchart showing an outline of processes when an imaging apparatus according to a sixth embodiment of the present invention is set in the underwater shooting mode.

FIG. 34 is a flowchart showing an outline of processes when the imaging apparatus 401 is set in the underwater shooting mode. There will be first described a case in which the underwater detector 402 detects that the imaging apparatus 401 is underwater (step S521: Yes). In this case, when the release switch 5a is pressed (step S522: Yes) and the power supply is in the power-on state (step S523: Yes), the imaging apparatus 401 performs shooting control (step S524) and returns to step S521. On the other hand, when the power supply is not in the power-on state (step S523: No), the power supply controller 112 controls the power supply unit 12 to turn on (step S525). When the underwater detector 402 detects that the imaging apparatus 401 is not underwater (step S521: No), the imaging apparatus 401 repeats step S521. The decision in step S521 can discriminate a case in which the imaging apparatus 401 is underwater and the photographer shoots while swimming from a case in which the imaging apparatus 401 is underwater and the photographer shoots while changing the water depth, and may decide that the imaging apparatus is underwater only when the photographer is swimming, like step S401 of FIG. 29.

Subsequent to step S525, the control unit 404 disables the switches other than the release switch 5a (step S526).

Thereafter, when the release switch 5a is pressed halfway (step S527: Yes), the control unit 404 performs the operation control depending on the number of times of pressing the release switch halfway (step S528). A relationship between the number of times of pressing the release switch halfway and the operation control contents is the same as that described in the fifth embodiment (see FIG. 28).

Subsequently, the display unit 4 displays the information on the set operation mode (step S529). The display contents on the display unit 4 in step S529 are the same as those described in the fifth embodiment (see FIG. 30).

Then, when the release operation is performed (step S530: Yes), the imaging apparatus 401 performs the shooting control depending on the operation mode (step S531), and then resets the operation mode (step S532) and returns to step S521.

On the other hand, when the release operation is not performed (step S530: No), if a predetermined time has elapsed since the display of the operation mode by the display unit 4 (step S533: Yes), the imaging apparatus 401 proceeds to step S532. To the contrary, if a predetermined time has not elapsed since the display of the operation mode by the display unit 4 (step S533: No), the imaging apparatus 401 returns to step S521.

When the release switch 5a is not pressed halfway in step S527 (step S527: No), and a predetermined time has elapsed since the disablement of the switches other than the release switch 5a (step S534: Yes), the imaging apparatus 401 proceeds to step S532. On the other hand, if a predetermined time has not elapsed since the disablement of the switches other than the release switch 5a in step S534 (step S534: No), the imaging apparatus 401 returns to step S527.

There will be described below a case in which the release switch 5a is not pressed in step S522 (step S522: No). When the power supply switch is operated (step S535: Yes) and the operation is the power-off operation (step S536: Yes), the power supply controller 112 turns off the power supply (step S537). Then the imaging apparatus 401 returns to step S521.

On the other hand, when the power supply switch is operated (step S535: Yes) and the operation is not the power-off operation (step S536: No), the power supply controller 112 controls the power supply unit 12 to turn on (step S538). In this case, when the mode switching operation is further performed (step S539: Yes), the control unit 404 switches the operation mode depending on the switch operation (step S540). Then the imaging apparatus 401 proceeds to step S530.

When the power supply switch is not operated in step S535 (step S535: No) and the mode switching operation is not performed in step S539 (step S539: No), the imaging apparatus 401 returns to step S521.

According to the sixth embodiment of the present invention, there is performed the operation control defined depending on a remainder obtained by dividing the number of times of detecting a predetermined underwater operation by a predetermined number, thereby simplifying the operations to be performed by the photographer. Thus, the operations during the underwater shooting can be easily and accurately performed. Also erroneous operations can be prevented underwater.

According to the sixth embodiment, since the operation of pressing halfway the release switch to be used for overland focus lock cannot be utilized underwater, another function is assigned to the operation of pressing the release switch halfway. Consequently, the photographer can perform all the operations by one finger underwater.

Seventh Embodiment

In a seventh embodiment of the present invention, when the photographer holds the imaging apparatus with both hands in the underwater shooting mode, a tap by the left hand which does not operate the release switch is regarded as a signal input other than release signal. On the other hand, when the photographer holds the imaging apparatus with only the right hand in the underwater shooting mode, the right hand's shaking or the input through the group of switches other than the release switch is regarded as signal input other than release signal.

Figure 35:
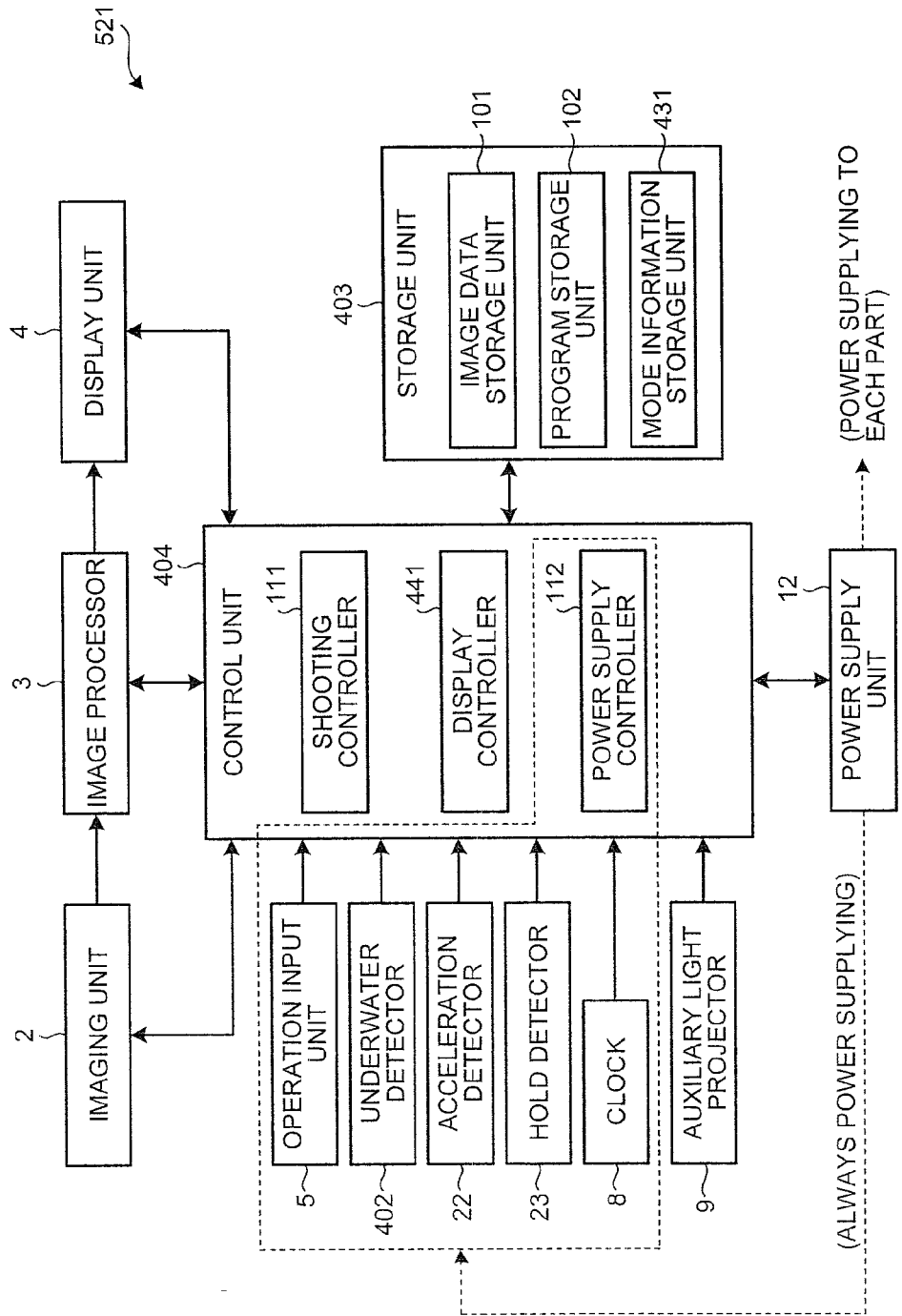
FIG. 35 is a block diagram showing a configuration of an imaging apparatus according to a seventh embodiment of the present invention.

FIG. 35 is a block diagram showing a configuration of an imaging apparatus according to the seventh embodiment of the present invention. The imaging apparatus 521 shown in FIG. 35 includes the hold detector 23 like the imaging apparatus 21 in addition to the configuration of the imaging apparatus 401.

In the above-configured imaging apparatus 521, the positions of the hands holding the imaging apparatus 521 are detected and the imaging apparatus 521 is controlled depending on the tapping or shaking operation input.

Figure 36:
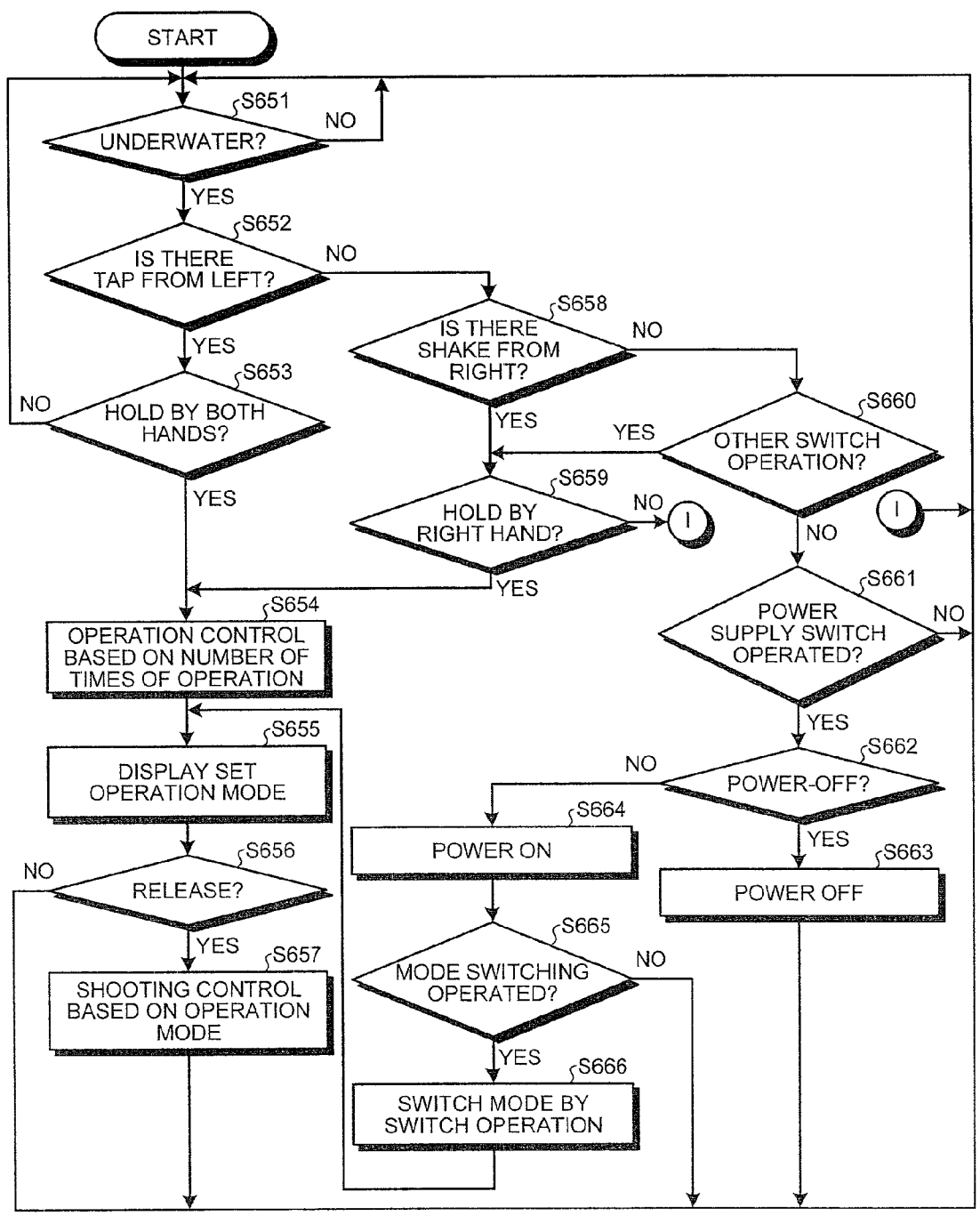
FIG. 36 is a flowchart showing an outline of processes when the imaging apparatus according to the seventh embodiment of the present invention is set in the underwater shooting mode.

FIG. 36 is a flowchart showing an outline of processes to be performed by the imaging apparatus according to the seventh embodiment of the present invention. There will be first described a case in which the underwater detector 402 detects that the imaging apparatus 521 is underwater (step S651: Yes), the acceleration detector 22 detects a tap from the left surface of the imaging apparatus 521 viewed from the rear surface thereof (step S652: Yes) and the hold detector 23 detects that the imaging apparatus 521 is held by both hands (step S653: Yes). When the underwater detector 402 detects that the imaging apparatus 521 is not underwater in step S651 (step S651: No), the imaging apparatus 521 repeats step S651. The underwater decision in step S651 may discriminate a case in which the imaging apparatus 521 is underwater and the photographer shoots while swimming from a case in which the imaging apparatus 521 is underwater and the photographer shoots while changing the water depth like step S401 of FIG. 29, and may decide that the imaging apparatus 521 is underwater only when the photographer is swimming underwater.

Figure 37:
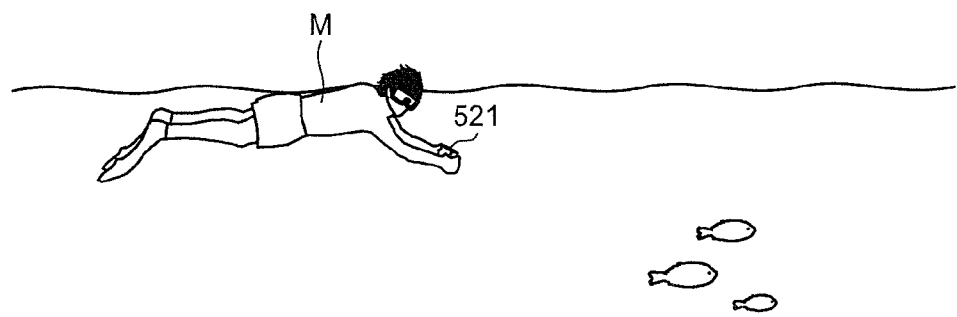
FIG. 37 is a diagram showing a situation in which the photographer uses the imaging apparatus according to the seventh embodiment of the present invention to shoot while swimming immediately below the water surface.
Figure 38:
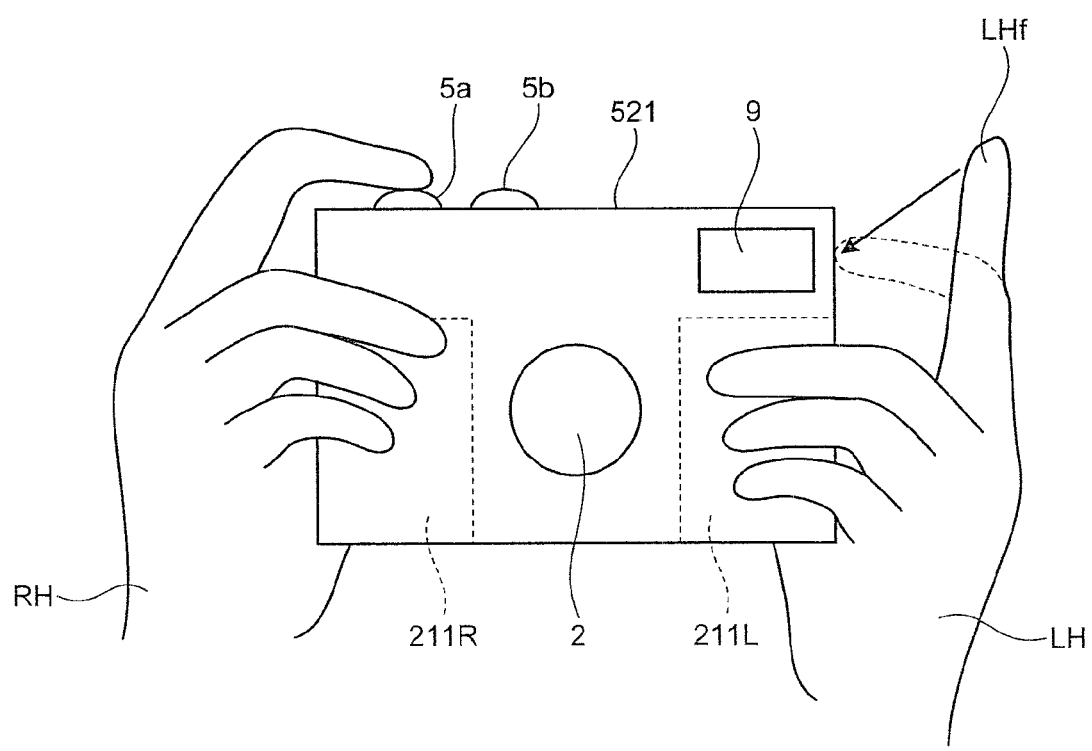
FIG. 38 is a diagram showing a situation in which the photographer holds the imaging apparatus according to the seventh embodiment of the present invention with both hands and taps it with the left hand.

Thereafter, the control unit 404 performs the operation control depending on the number of times of tap operation (step S654). A relationship between the number of times of operation and the operation control contents is the same as that of the fifth embodiment (see FIG. 28). FIG. 37 is a diagram showing a situation in which the photographer M holds the imaging apparatus 521 with both hands and is ready to shoot. As shown in FIG. 37, when the photographer M is swimming immediately below the water surface, the photographer M can use both hands for shooting. As shown in FIG. 38, the right hand RH only operates the release switch 5a of the imaging apparatus 521 and the left hand LH's forefinger LHf taps the surface of the imaging apparatus 521 so that the operation mode may be switched.

Subsequent to step S654, the display unit 4 displays the information on the set operation mode (step S655). Then, when the release operation is performed through the release switch 5a (step S656: Yes), the shooting controller 111 performs the shooting control depending on the set mode (step S657). Thereafter, the imaging apparatus 521 returns to step S651. When the release operation is not performed in step S656 (step S656: No), the imaging apparatus 521 repeats step S656.

When the hold detector 23 does not detect that the imaging apparatus is not held by both hands in step S653 (step S653: No), the imaging apparatus 521 returns to step S651.

There will be described below a case in which the acceleration detector 22 does not detect a tap from the left surface (step S652: No) and first detects shaking from the right side to the left side (step S658: Yes). In this case, when the hold detector 23 detects that the imaging apparatus 521 is held by the right hand (step S659: Yes), the imaging apparatus 521 proceeds to step S654. On the other hand, when the hold detector 23 does not detect that the imaging apparatus 521 is held by the right hand (step S659: No), the imaging apparatus 521 returns to step S651.

Figure 39:
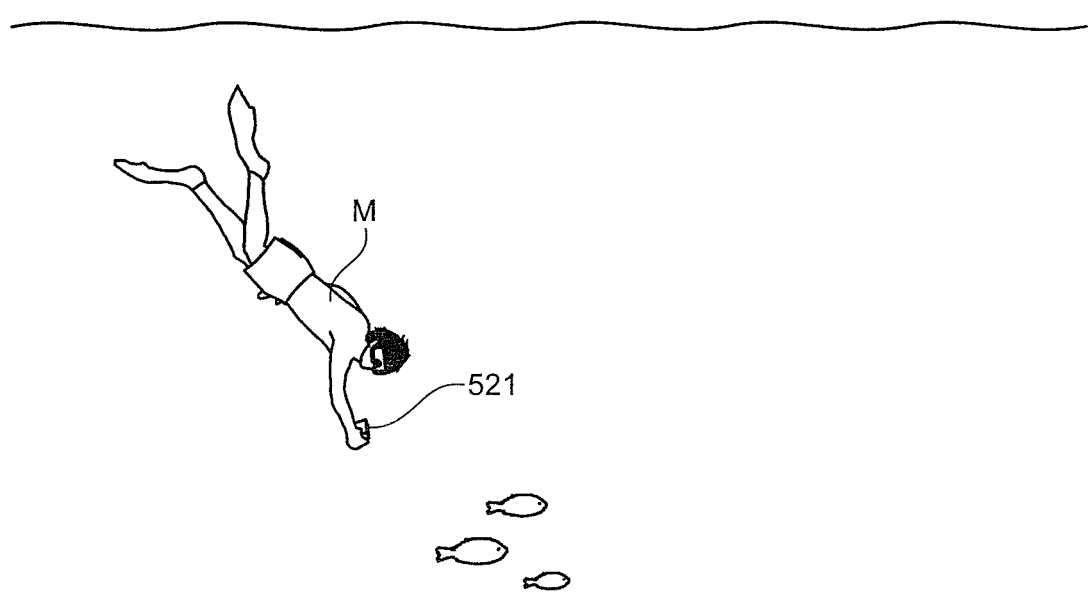
FIG. 39 is a diagram showing a situation in which the photographer uses the imaging apparatus according to the seventh embodiment of the present invention to shoot while skin diving.

FIG. 39 is a diagram showing a situation in which the photographer M holds the imaging apparatus 521 by the right hand and is ready to shoot. As shown in FIG. 39, when the photographer is underwater, he/she uses the left hand for swimming because of the positional relationship with the release switch 5a. Thus, the left hand is difficult to use for operating the imaging apparatus 521 under the situation of FIG. 39. In the seventh embodiment, the right hand's shaking functions as switch operation.

When the acceleration detector 22 does not detect the shaking in step S658 (step S658: No) and a switch other than the release switch 5a and the power supply switch (other switch operation) is operated (step S660: Yes), the imaging apparatus 521 proceeds to step S659.

In this way, in the seventh embodiment, when the imaging apparatus 521 is not tapped or shaken, other switch operation is operated, and the imaging apparatus 521 is held by the right hand, the control unit 404 performs the operation control depending on the number of times of other switch operation. In this sense, in the seventh embodiment, when the imaging apparatus 521 is not tapped or shaken and the imaging apparatus 521 is held by the right hand, other switch operations are all regarded as the same.

When other switch is not operated in step S660 (step S660: No) and when the power supply switch 5b is operated (step S661: Yes), if the power supply switch operation is the power-off operation (step S662: Yes), the power supply controller 112 controls the power supply unit 12 to turn off (step S663). Thereafter, the imaging apparatus 521 returns to step S651.

When the power supply switch operation is not the power-off operation in step S662 (step S662: No), the power supply controller 112 controls the power supply unit 12 to turn on (step S664). Subsequently, when the mode switching is operated (step S665: Yes), the control unit 404 switches the operation mode depending on the switch operation (step S666). Then the imaging apparatus 521 proceeds to step S655.

When the power supply switch is not operated in step S661 (step S661: No) and the mode switching is not performed in step S665 (step S665: No), the imaging apparatus 521 returns to step S651.

According to the seventh embodiment of the present invention described above, there is performed the operation control defined depending on a remainder obtained by dividing the number of times of detecting a predetermined underwater operation by a predetermined number, thereby simplifying the operations to be performed by the photographer. Thus, the operations during the underwater shooting can be easily and accurately performed. Further, erroneous operations can be prevented underwater.

In the seventh embodiment, the switch operation may be performed by changing a pressure by a photographer's hand or finger holding the imaging apparatus 521. In this case, the presence of the operation input is decided based on a change in pressure detected by the hold detector 23.

The techniques described in the first to seventh embodiments can be appropriately selected or combined depending on product's concept or user's preference. The first to seventh embodiments are appropriately selected or combined, thereby realizing the imaging apparatus capable of being suitably operated depending on the usage environment or usage situation.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An imaging apparatus comprising:
an imaging unit for capturing a subject and generating image data of the subject;
an operation input unit for receiving inputs of operation signals containing a release signal for instructing the imaging unit to shoot;
an acceleration detector for detecting an acceleration of the imaging apparatus;
a state detector for separately detecting a case in which the imaging apparatus is overland, a case in which the imaging apparatus is underwater and a photographer shoots while swimming, and a case in which the imaging apparatus is underwater and the photographer shoots while changing a water depth, the state detector including a water depth detector for detecting a water depth at a predetermined period when the imaging apparatus is underwater, and a water depth change calculator for calculating the amount of change in water depth detected by the water depth detector;
a power supply unit for supplying power to predetermined parts containing the imaging unit;
a hold detector for detecting an external hold based on a pressure applied to a predetermined area; and
a control unit for performing operation control depending on an input into the operation input unit and/or into the acceleration detector according to a state detection result by the state detector, the control unit including a power supply controller for controlling power supplying by the power supply unit, wherein the control unit controls the imaging unit to continuously shoot predetermined number of times when the release signal is input from the operation input unit and the amount of change in water depth calculated by the water depth change calculator is larger than a first threshold of predetermined positive number, wherein when the release signal is input from the operation input unit and the amount of change in water depth calculated by the water depth change calculator is larger than the first threshold, the control unit sets an exposure time of the imaging unit to be shorter than an initial setting, controls a gain of the imaging unit to be higher than an initial setting, and then controls the imaging unit to continuously shoot the predetermined number of times,
wherein when the amount of change between the two latest water depths calculated by the water depth change calculator is larger than the first threshold, the power supply controller transits to a state in which the power supply unit can supply power to the entire imaging apparatus, and
wherein when the acceleration detector detects a pulse shaped acceleration having a magnitude larger than a predetermined value or the hold detector detects a hold having a pressure larger than a predetermined pressure while the power supply unit stops supplying power to parts other than the always-on parts containing the acceleration detector, the hold detector, the operation input unit, the water depth detector, the water depth change calculator and the power supply controller, the water depth change calculator calculates the amount of change between two latest water depths detected by the water depth detector.

2. The imaging apparatus according to claim 1, wherein the control unit switches shooting control of the image data in response to an input into the operation input unit according to a state detection result by the state detector.

3. The imaging apparatus according to claim 1, wherein when the release signal is input while the power supply unit stops supplying power to parts other than the always-on parts containing the operation input unit, the water depth detector, the water depth change calculator and the power supply controller, the water depth change calculator calculates the amount of change between two latest water depths detected by the water depth detector.

4. The imaging apparatus according to claim 1,
wherein when the acceleration detector detects a pulse-shaped acceleration having a magnitude larger than a predetermined value while the power supply unit stops supplying power to parts other than the always-on parts containing the acceleration detector, the operation input unit, the water depth detector, the water depth change calculator and the power supply controller, the water depth change calculator calculates the amount of change between two latest water depths detected by the water depth detector, and
when the amount of change between the two latest water depths calculated by the water depth change calculator is larger than the first threshold and the release signal is input, the power supply controller transits to a state in which the power supply unit can supply power to the entire imaging apparatus.

5. The imaging apparatus according to claim 1,
wherein when the amount of change between the two latest water depths calculated by the water depth change calculator is larger than the first threshold and the release signal is input, the power supply controller transits to a state in which the power supply unit can supply power to the entire imaging apparatus.

6. The imaging apparatus according to claim 5, wherein the hold detector detects pressures applied to two areas provided at both ends in a longitudinal direction of the imaging apparatus, respectively, and
the control unit controls the imaging unit for still image shooting when the hold detector detects pressures larger than a predetermined pressure in the two areas, and controls the imaging unit for moving picture shooting when the hold detector detects a pressure larger than the predetermined pressure in one of the two areas closer to a release switch through which the release signal is input.

7. The imaging apparatus according to claim 1, wherein the water depth change calculator calculates the amount of change between two latest water depths detected by the water depth detector when an operation signal other than the release signal is input through the operation input unit while the imaging unit is able to shoot, and
the power supply controller stops power supplying by the power supply unit to parts other than the always-on parts when the amount of change between the two latest water depths calculated by the water depth change calculator is smaller than a second threshold having a different sign from the first threshold.

8. The imaging apparatus according to claim 1, wherein the water depth detector includes a water pressure sensor for detecting a water pressure applied to the imaging apparatus.

9. The imaging apparatus according to claim 2, wherein the power supply unit always supplies power to the water depth detector, the acceleration detector, the water depth change calculator and the power supply controller, and
when the acceleration detector detects a pulse-shaped acceleration having a magnitude larger than a predetermined value and when the absolute value of the amount of change between two latest water depths calculated by the water depth change calculator is smaller than a fourth threshold of predetermined positive number, the power supply controller transits to a state in which the power supply unit can supply power to the entire imaging apparatus.

10. The imaging apparatus according to claim 9, further comprising:
a shooting controller for controlling the imaging unit to shoot,
wherein the operation input unit is always supplied with power by the power supply unit for receiving inputs of operation signals containing a release signal for instructing the imaging unit to shoot, and
wherein the shooting controller controls the imaging unit to continuously shoot predetermined number of times when the release signal is input from the operation input unit and the amount of change in water depth calculated by the water depth change calculator is larger than a fifth threshold set to be larger than the fourth threshold.

11. The imaging apparatus according to claim 10, wherein when the amount of change in water depth calculated by the water depth change calculator is larger than the fifth threshold and the release signal is input from the operation input unit, the shooting controller sets an exposure time of the imaging unit to be shorter than an initial setting, controls a gain of the imaging unit to be higher than an initial setting, and then controls the imaging unit to continuously shoot predetermined number of times.

12. The imaging apparatus according to claim 11, wherein when the release signal is input while the power supply unit stops supplying power to parts other than the always-on parts containing the operation input unit, the water depth detector, the acceleration detector, the water depth change calculator and the power supply controller, the water depth change calculator calculates a change between two latest water depths detected by the water depth detector, and
when the amount of change between the two latest water depths calculated by the water depth change calculator is larger than the fifth threshold, the power supply controller transits to a state in which the power supply unit can supply power to the entire imaging apparatus.

13. The imaging apparatus according to claim 10, wherein the water depth change calculator calculates the amount of change between two latest water depths detected by the water depth detector when an operation signal other than the release signal is input through the operation input unit while the imaging unit is able to shoot, and
the power supply controller stops power supplying by the power supply unit to parts other than the always-on parts when the amount of change between the two latest water depths calculated by the water depth change calculator is smaller than a sixth threshold having a different sign from the fifth threshold.

14. The imaging apparatus according to claim 10,
wherein the hold detector detects pressures applied to two areas provided at both ends in a longitudinal direction of the imaging apparatus, and
the shooting controller controls the imaging unit for still image shooting when the hold detector detects pressures larger than a predetermined pressure in the two areas, and controls the imaging unit for moving picture shooting when the hold detector detects a pressure larger than the predetermined pressure in one of the two areas closer to a release switch through which the release signal is input.

15. The imaging apparatus according to claim 9, wherein the water depth detector includes a water pressure sensor for detecting a water pressure applied to the imaging apparatus.

16. The imaging apparatus according to claim 9, wherein the acceleration detector further comprises a posture decision unit for detecting components of a gravity acceleration at a predetermined period in a three-dimensional orthogonal coordinate system fixed in the imaging apparatus when the imaging apparatus is overland, and for deciding a posture of the imaging unit by using the components of the gravity acceleration detected by the acceleration detector, and
when the posture decision unit decides that the imaging apparatus is ready to shoot in its posture, the power supply controller transits to a state in which the power supply unit can supply power to the entire imaging apparatus.

17. The imaging apparatus according to claim 1,
wherein when the state detector detects that the imaging apparatus is underwater and when the acceleration detector detects a pulse-shaped acceleration having a magnitude larger than a predetermined value, the control unit performs operation control based on the number of times of operation corresponding to a remainder obtained by dividing the number of times of detecting the pulse-shaped acceleration by the total number of underwater-settable operation contents.

18. The imaging apparatus according to claim 17, wherein
the power supply unit always supplies power to the operation input unit, the state detector, the acceleration detector and the power supply controller, and the power supply controller transits to a state in which the power supply unit can supply power to the entire imaging apparatus when the remainder is 1.

19. The imaging apparatus according to claim 18, wherein the power supply controller controls the power supply unit to stop supplying power to parts other than the always-on parts when the remainder is maximum.

20. The imaging apparatus according to claim 1,
wherein when the state detector detects that the imaging apparatus is underwater, the control unit regards inputs into multiple switches other than the release switch as identifiable, and performs operation control defined depending on a remainder obtained by dividing the number of times of inputting from the identifiable switches by the total number of underwater-settable operation contents.

21. The imaging apparatus according to claim 20, wherein
the power supply unit always supplies power to the operation input unit, the state detector and the power supply controller, and the power supply controller transits to a state in which the power supply unit can supply power to the entire imaging apparatus when the remainder is 1.

22. The imaging apparatus according to claim 21, wherein the power supply controller controls the power supply unit to stop supplying power to parts other than the always-on parts when the remainder is maximum.

23. The imaging apparatus according to claim 1,
wherein when the state detector detects that the imaging apparatus is underwater, the control unit disables the inputting into multiple switches other than the release switch, and performs operation control defined depending on a remainder obtained by dividing the number of times of pressing the release switch halfway by the total number of underwater-settable operation contents.

24. The imaging apparatus according to claim 23, wherein
the power supply unit always supplies power to the operation input unit, the state detector and the power supply controller, and the power supply controller transits to a state in which the power supply unit can supply power to the entire imaging apparatus when the remainder is 1.

25. The imaging apparatus according to claim 24, wherein the power supply controller controls the power supply unit to stop supplying power to parts other than the always-on parts when the remainder is maximum.

26. The imaging apparatus according to claim 1,
wherein when the state detector detects that the imaging apparatus is underwater, when the acceleration detector detects a pulse-shaped acceleration having a magnitude larger than a predetermined value, and when a detection result by the acceleration detector and a detection result by the hold detector meet a predetermined correspondence, the control unit performs operation control defined depending on a remainder obtained by dividing the number of times of detecting the pulse-shaped acceleration by the total number of underwater-settable operation contents.

27. The imaging apparatus according to claim 26, wherein
the power supply unit always supplies power to the operation input unit, the state detector, the acceleration detector, the hold detector and the power supply controller, and the power supply controller transits to a state in which the power supply unit can supply power to the entire imaging apparatus when the remainder is 1.

28. The imaging apparatus according to claim 27, wherein the power supply controller controls the power supply unit to stop supplying power to parts other than the always-on parts when the remainder is maximum.

29. The imaging apparatus according to claim 17, further comprising:
a display unit for displaying information containing image data generated by the imaging unit,
wherein when the state detector detects that the imaging apparatus is underwater, the control unit displays textual information indicating the operation contents defined depending on the remainder as main information on the display unit.

* * * * *